(12) United States Patent
Engelbart

(10) Patent No.: US 9,214,018 B1
(45) Date of Patent: Dec. 15, 2015

(54) METHOD FOR REMOTE REWORK IMAGING FOR PART INCONSISTENCIES

(71) Applicant: The Boeing Company, Chicago, IL (US)

(72) Inventor: Roger W. Engelbart, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 220 days.

(21) Appl. No.: 13/868,724

(22) Filed: Apr. 23, 2013

Related U.S. Application Data

(63) Continuation-in-part of application No. 13/334,512, filed on Dec. 22, 2011, now Pat. No. 8,687,872, which is a continuation of application No. 12/103,178, filed on Apr. 15, 2008, now Pat. No. 8,094,921.

(51) Int. Cl.
*G06K 9/00* (2006.01)
*G06T 7/00* (2006.01)
*G03B 29/00* (2006.01)

(52) U.S. Cl.
CPC .............. *G06T 7/0004* (2013.01); *G03B 29/00* (2013.01)

(58) Field of Classification Search
CPC .......... G01N 2021/8472; G03B 29/00; G06T 7/0004
See application file for complete search history.

(56) References Cited

U.S. PATENT DOCUMENTS

| | | | |
|---|---|---|---|
| 7,236,625 B2 | 6/2007 | Engelbart et al. | |
| 7,463,368 B2 | 12/2008 | Morden et al. | |
| 7,480,037 B2 | 1/2009 | Palmateer et al. | |
| 7,489,392 B2 | 2/2009 | Engelbart et al. | |
| 7,495,758 B2 | 2/2009 | Walton | |
| 7,508,971 B2 | 3/2009 | Vaccaro et al. | |
| 7,587,080 B1 | 9/2009 | Good | |
| 7,626,692 B2 | 12/2009 | Engelbart et al. | |
| 8,094,921 B2 | 1/2012 | Engelbart et al. | |
| 2004/0189944 A1* | 9/2004 | Kaufman et al. | 352/10 |
| 2007/0034313 A1 | 2/2007 | Engelbart et al. | |
| 2007/0127015 A1* | 6/2007 | Palmateer et al. | 356/237.1 |
| 2012/0093391 A1 | 4/2012 | Engelbart et al. | |

OTHER PUBLICATIONS

Engelbart, "Method and Apparatus for Reworking Inconsistencies on Parts," U.S. Appl. No. 13/480,984, filed May 25, 2012, 74 pages.
Non-final office action dated Jan. 11, 2013 regarding U.S. Appl. No. 13/334,512, 17 pages.
Non-final office action dated May 25, 2011 regarding U.S. Appl. No. 12/103,178, 13 pages.
Notice of allowance dated Sep. 28, 2011 regarding U.S. Appl. No. 12/103,178, 8 pages.
Notice of Allowance, dated Oct. 30, 2013, regarding U.S. Appl. No. 13/334,512, 11 pages.

* cited by examiner

*Primary Examiner* — Kara E Geisel
(74) *Attorney, Agent, or Firm* — Yee & Associates, P.C.

(57) ABSTRACT

A method for reworking an inconsistency on a part. A location of the inconsistency is identified for the part in a model of the part. An image is generated for a rework for the part. The image is projected for the rework on the part based on the location identified for the inconsistency. The rework is performed for the inconsistency on the part using the image projected on the part.

18 Claims, 22 Drawing Sheets

METHOD FOR REMOTE REWORK IMAGING FOR PART INCONSISTENCIES

CROSS-REFERENCE TO RELATED APPLICATIONS

This application is a continuation-in-part of patent application U.S. Ser. No. 13/334,512, filed Dec. 22, 2011, entitled "Method and System for Remote Rework Imaging for Part Inconsistencies,", which is a continuation application of patent application U.S. Ser. No. 12/103,178, filed Apr. 15, 2008, entitled "Method and System for Remote Rework Imaging for Part Inconsistencies,", each of which are incorporated herein by reference.

BACKGROUND INFORMATION

1. Field

The present disclosure is generally related to a method and system for remote rework imaging for part inconsistencies. The disclosure has particular utility in connection with rework of composite parts and structures found in vehicles, including, but not limited to, aircraft, autos, trucks, buses, trains, ships or satellites and will be described in connection with such utility, although other utilities are contemplated.

2. Background

A wide variety of nondestructive evaluation methods (nondestructive inspection), such as ultrasonics, eddy current, x-ray, magnetic resonance, and microwave, have been utilized to inspect post-manufacture parts, which may comprise metal and/or composite and/or ceramic parts or other types of parts. Both water based, gantry style systems, and portable instruments have been utilized to conduct this evaluation. Some of the prior art methods conduct scans of the post-manufacture parts, and then print out full-scale paper plots of the parts or the inconsistency areas, which are then aligned over the parts in order to rework the inconsistencies. Sometimes, the inconsistency areas of the printed plot are cut out in order to trace the inconsistencies on the parts. Other methods overlay the printed plot with a transparent Mylar sheet in order to trace the outlines of any inconsistencies on the Mylar, which is then laid over the part in order to trace the inconsistencies onto the part for rework of the inconsistencies. Mylar is a polyethylene terephthalate polyester film. One or more of these methods may be costly, may take substantial time, may be difficult to administer, may be inefficient, may be inconsistent, may lead to error, may not allow for repeatability, and/or may experience other types of problems.

Further, for the rework to be made, one or more engineers frequently need to review the plotted inconsistency and develop a plan to rework, remove, or diminish the inconsistencies. Once the plan is developed, the engineer(s) join one or more technicians and explain to the technicians how the inconsistencies should be reworked. This method of resolving inconsistencies requires engineers to be on-site in any manufacturing site at which rework of inconsistencies may occur. Sometimes, the engineer will plot the rework (e.g., injection hole locations) on the same paper or other surface on which the inconsistency is plotted. The technician will attempt to use that plotted rework to carry out the rework. However, if the plot is not properly aligned on the part, the inconsistency will be incorrectly reworked.

Therefore, it would be desirable to have a method and apparatus that takes into account at least some of the issues discussed above, as well as other possible issues.

SUMMARY

In one illustrative embodiment, a method for reworking an inconsistency on a part is present. A location of the inconsistency is identified for the part in a model of the part. An image is generated for a rework for the part. The image is projected for the rework on the part based on the location identified for the inconsistency. The rework is performed for the inconsistency on the part using the image projected on the part.

In another illustrative embodiment, an apparatus comprises a rework generator configured to identify a location of an inconsistency for a part in a model of the part. The rework generator is further configured to generate an image for a rework for the part. The rework generator is still further configured to project the image for the rework on the part based on the location identified for the inconsistency. The rework generator is further configured to perform the rework for the inconsistency on the part using the image projected on the part.

Other systems, methods, features, and advantages of the present disclosure will be or become apparent upon examination of the following drawings and detailed description. It is intended that all such additional systems, methods, features, and advantages be included within this disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
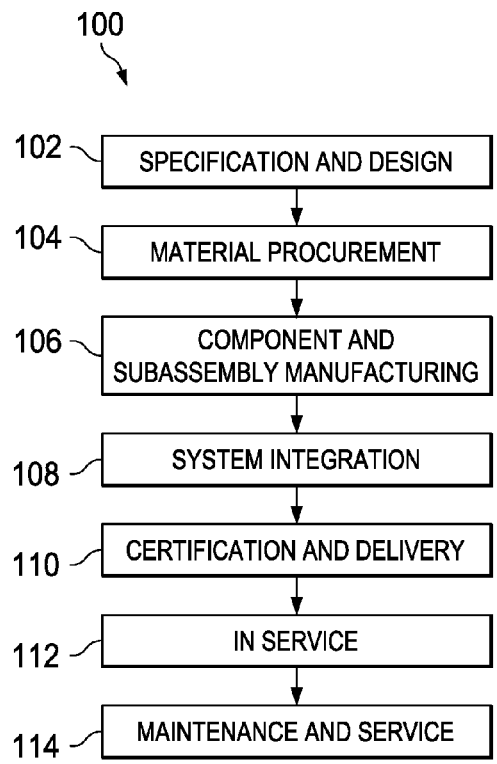
FIG. 1 is an illustration of an aircraft manufacturing and service method in the form of a block diagram in accordance with an illustrative embodiment.
Figure 2:
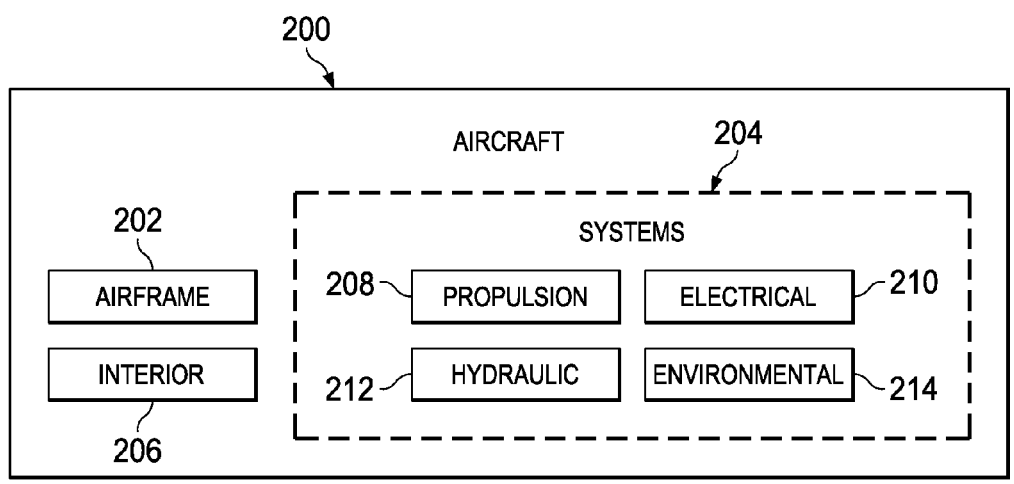
FIG. 2 is an illustration of an aircraft in the form of a block diagram in which an illustrative embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in the form of a block diagram in accordance with an illustrative embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 2, an illustration of an aircraft is depicted in the form of a block diagram in which an illustrative embodiment may be implemented. In this example, aircraft 200 is produced by aircraft manufacturing and service method 100 in FIG. 1 and may include airframe 202 with systems 204 and interior 206. Examples of systems 204 include one or more of propulsion system 208, electrical system 210, hydraulic system 212, and environmental system 214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 100 in FIG. 1. As used herein, the phrase "at least one of," when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C. The item may be a particular object, thing, or a category. In other words, at least one of means any combination of items and number of items may be used from the list but not all of the items in the list are required.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different illustrative embodiments may substantially expedite the assembly of and/or reduce the cost of aircraft 200.

Figure 3:
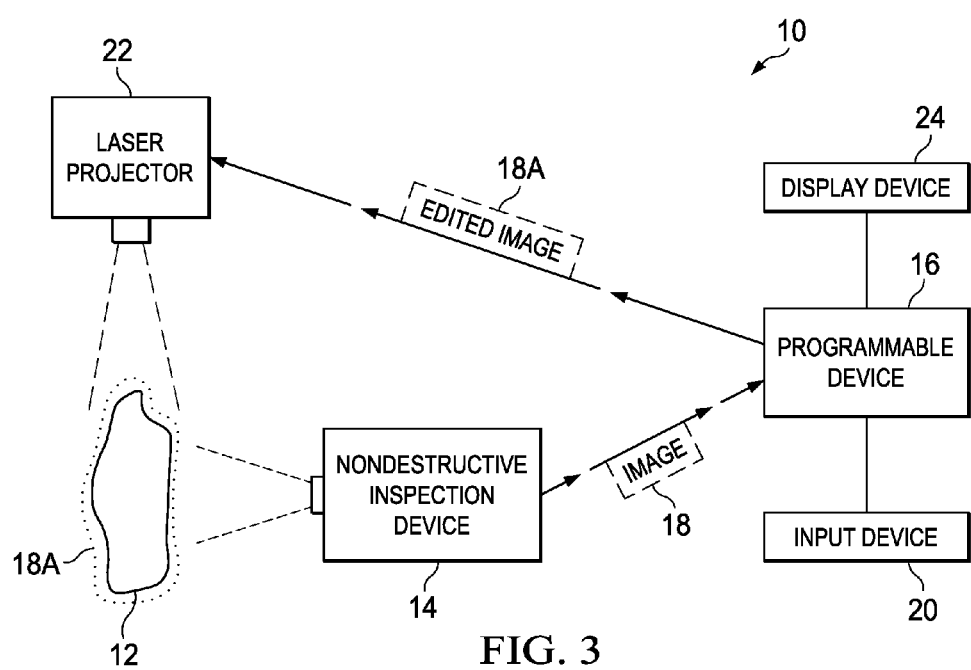
FIG. 3 is an illustration of a system for remote rework imaging for a part inconsistency in accordance with an illustrative embodiment.

FIG. 3, an illustration of system 10 for remote rework imaging for part inconsistency 12, is depicted in accordance with an illustrative embodiment. "Inconsistency," as used in the appropriate context throughout this disclosure, refers to the difference and/or out-of-tolerance between one or more measured characteristics of a part or structure under test and/ or examination (and potentially effected by exposure to factor(s) including, but not limited to, thermal load(s), moisture, galvanic action, structural load(s), lightning, or electrical arcing) with expected values for the same characteristics of an analogous structure within tolerance and/or unaffected by exposure to those factors. "Rework," as used in the appropriate context throughout this disclosure, refers to changing and/or adjusting an out-of-tolerance condition to a condition within tolerance.

System 10 contains nondestructive inspection device 14. Programmable device 16 for viewing and editing images is in communication with nondestructive inspection device 14 as described below. Image 18 of the part inconsistency 12 is communicated from nondestructive inspection device 14 and edited on programmable device 16. Input device 20 is in communication with programmable device 16. Input device 20 is useful for editing image 18 on programmable device 16. Laser projector 22 is in communication with programmable device 16. Laser projector 22 is local to the part or structure under tests. Edited image 18A is projected from laser projector 22 onto part inconsistency 12.

Nondestructive inspection device 14 could be any of a number of known inspection devices, including ultrasonics, eddy current, x-ray, magnetic resonance, and microwave. Yet other known nondestructive inspection devices also advantageously may be used. The requirements on nondestructive inspection device 14 are that it is capable of inspecting the condition of a part or structure and producing image 18 of the same. Nondestructive inspection device 14 is in communication with programmable device 16. The communication is such that image 18 is communicated from nondestructive inspection device 14 to programmable device 16. Image 18 may be communicated by wireless or wired connection, through a network, through a portable disk or stick or other memory devices that may be used to transport an image file, or any combination of the above.

Programmable device 16 may be a personal computer, laptop, personal digital assistant, or any other electronic device that can be used to view and edit image 18 received from nondestructive inspection device 14. Programmable device 16 may include or be attached to input device 20. Input device 20 may include a mouse, digital pen, wand, touch screen, keyboard, or any other electronic device compatible with programmable device 16 that may be useful for editing image 18 received from nondestructive inspection device 14. Programmable device 16 may be attached to, integral with, or at least in communication with display device 24 for viewing image 18. A purpose of editing image 18 may include providing rework instructions and/or details for reworking part inconsistency 12. For example, an engineer may receive image 18 on programmable device 16 and use input device 20 to edit image 18 to detail the location of one or more injection holes for injecting resin into part inconsistency 12. A technician or laborer may use edited image 18A to rework part inconsistency 12.

Laser projector 22 is in communication with programmable device 16. The communication must be such that edited image 18A is communicable from programmable device 16 to laser projector 22. Edited image 18A may be communicated by wireless or wired connection, through a network, through a portable disk or stick or other memory device that may be used to transport an image file, or any combination of the above. Laser projector 22 may then be used to project edited image 18A onto part inconsistency 12. A technician or laborer may use edited image 18A to rework part inconsistency 12. The engineer responsible for detailing edited image 18A may be located remotely relative to part inconsistency 12 while still directing rework of the same.

Figure 4:
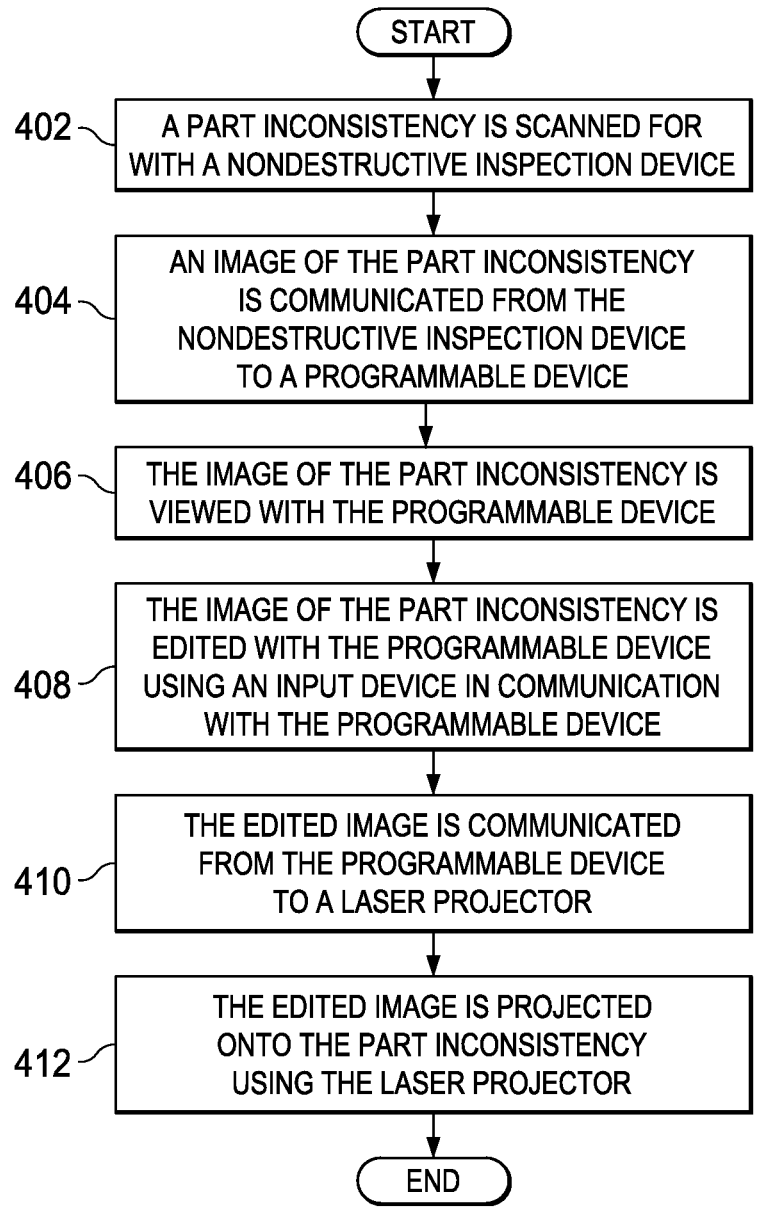
FIG. 4 is an illustration of a flowchart illustrating a method of remote rework imaging for a part inconsistency in accordance with an illustrative embodiment.

FIG. 4, an illustration of a flowchart illustrating a method of remote rework imaging for part inconsistency 12, is depicted in accordance with an illustrative embodiment. It should be noted that any process descriptions or blocks in flowcharts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved.

As is shown by operation 402, part inconsistency 12 is scanned for with nondestructive inspection device 14. Image 18 of part inconsistency 12 is communicated from nondestructive inspection device 14 to programmable device 16 (operation 404). Image 18 of part inconsistency 12 is viewed with programmable device 16 (operation 406). Image 18 of part inconsistency 12 is edited with programmable device 16 using input device 20 in communication with programmable device 16 (operation 408). Edited image 18A is communicated from programmable device 16 to laser projector 22 (operation 410). Edited image 18A is projected onto part inconsistency 12 using laser projector 22 (operation 412).

Figure 5:
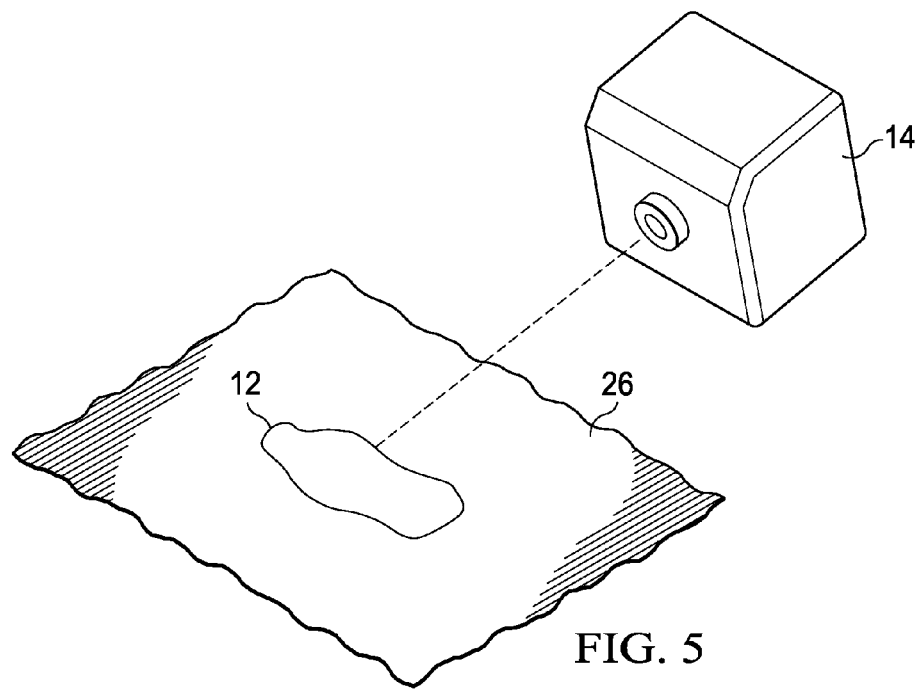
FIG. 5 is an illustration of the projection of data from a scan of a part inconsistency being scanned with a nondestructive inspection device in accordance with an illustrative embodiment.

FIG. 5, an illustration of the projection of data from a scan of part inconsistency 12 being scanned with nondestructive inspection device 14, is depicted in accordance with an illustrative embodiment. Part fragment 26 is shown being scanned in FIG. 5, but part inconsistency 12 may be found in a preconstruction part or in a fully constructed machine or device.

Figure 6:
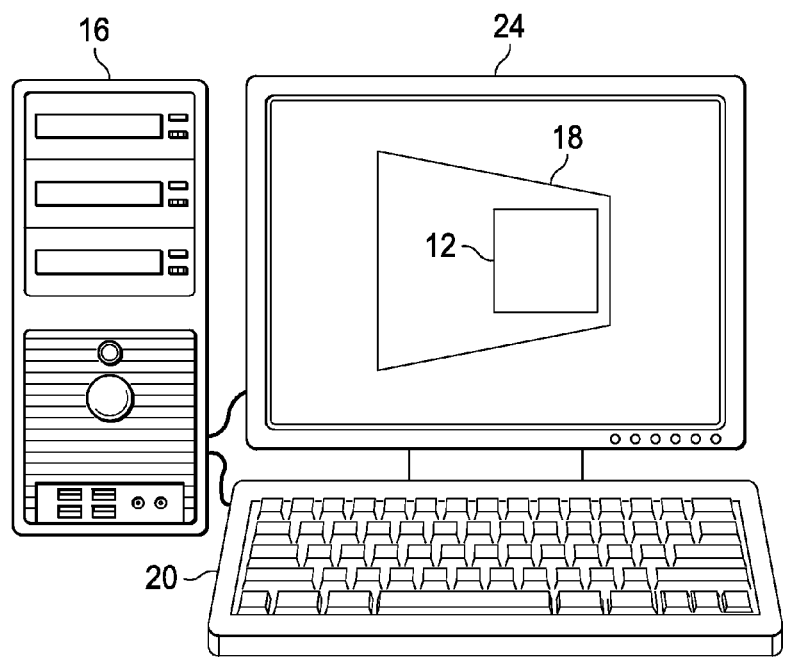
FIG. 6 is an illustration of an image of a part inconsistency viewed using a programmable device in accordance with an illustrative embodiment.

FIG. 6 is an illustration of image 18 of part inconsistency 12 of FIG. 5 viewed using programmable device 16 in accordance with an illustrative embodiment. Programmable device 16 is connected to display device 24 for viewing image 18 and input device 20 for editing image 18. Programmable device 16 shown in FIG. 6 is a personal computer, but could be a personal computer, laptop, personal digital assistant, or any other electronic device that can be used to view and edit image 18 received from nondestructive inspection device 14. Programmable device 16 may include image editing software for editing image 18.

Figure 7:
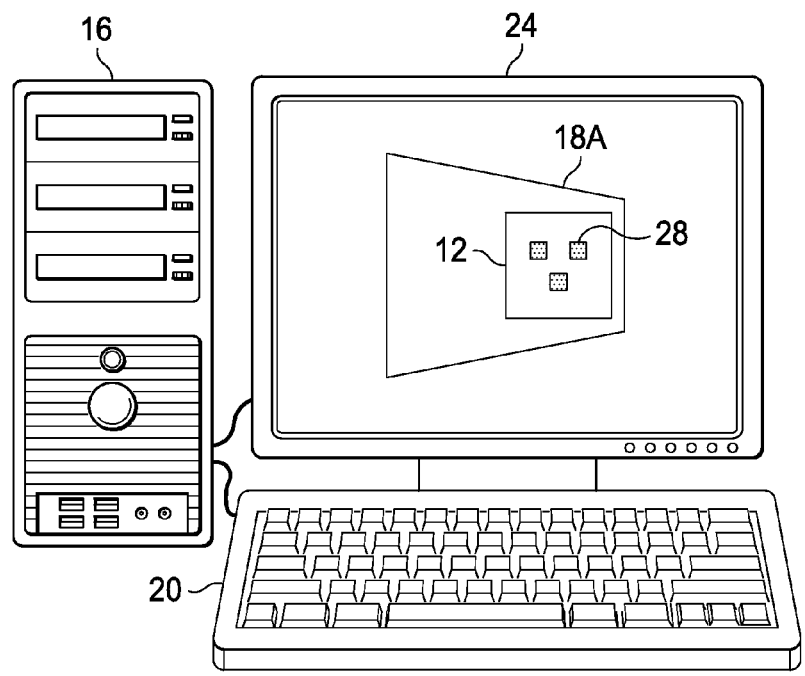
FIG. 7 is an illustration of an edited image of a part inconsistency viewed using a programmable device in accordance with an illustrative embodiment.

FIG. 7 is an illustration of edited image 18A of part inconsistency 12 of FIG. 6 viewed using programmable device 16 in accordance with an illustrative embodiment. The difference between image 18 shown in FIG. 6 and edited image 18A shown in FIG. 7 is the inclusion of injection locations 28 edited onto image 18. Injection locations 28 may identify locations on part inconsistency 12 where resin may be injected. While the rework referenced herein has been by resin injection, any rework that may be required to resolve a part inconsistency or other fault that may be identified with nondestructive inspection device 14 may be edited onto image 18 to form edited image 18A.

Figure 8:
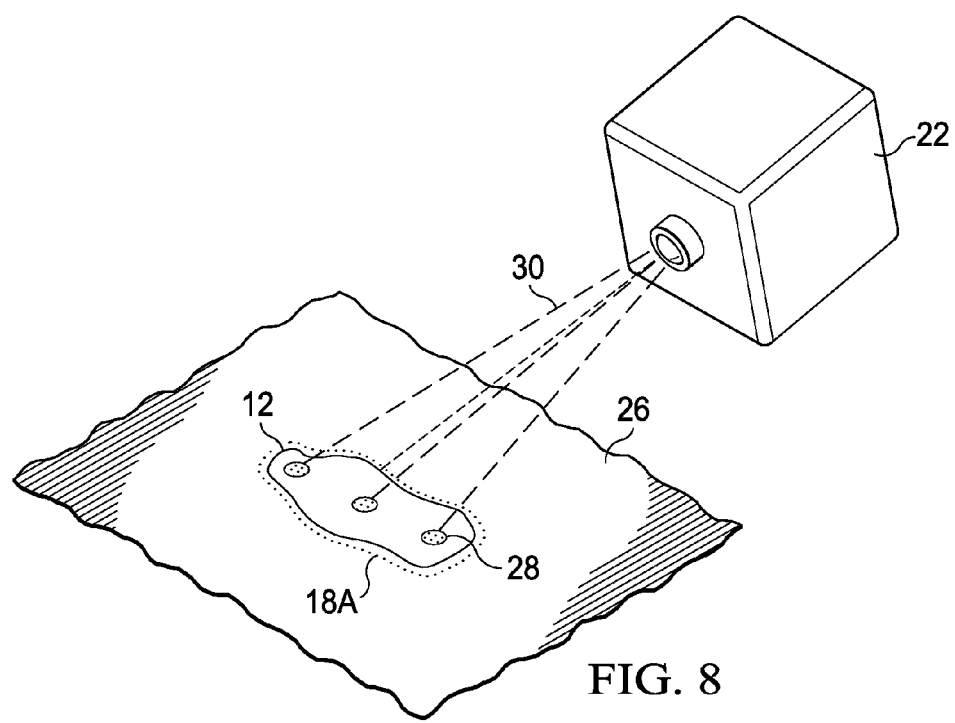
FIG. 8 is an illustration of an edited image projected onto a part fragment with a laser projector in accordance with an illustrative embodiment.

FIG. 8 is an illustration of edited image 18A of FIG. 7 projected onto part fragment 26 with laser projector 22 in accordance with an illustrative embodiment. Laser projector 22 may be any commercially available product that is capable of receiving edited image 18A from programmable device 16 and reproducing edited image 18A on part fragment 26 using emitted radiation 30. Emitted radiation 30 should operate on a visible wavelength. Edited image 18A projected onto part inconsistency 12 may include, as shown in the first exemplary embodiment, injection locations 28. A technician may use projected injection locations 28 to identify where to make injections of resin or a similar substance. Edited image 18A may also include notes or details that identify the material to be injected, a depth at which to make the injection, a volume of material to be injected, and/or any other information that may be useful to a technician reworking part inconsistency 12.

Figure 9:
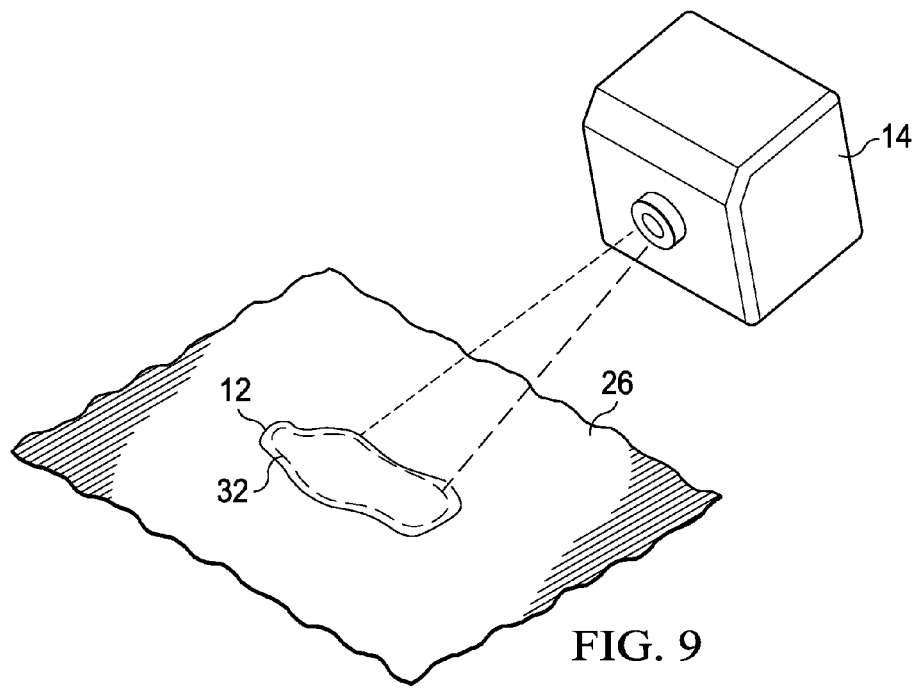
FIG. 9 is an illustration of the projection of data from a rescan of a part inconsistency being rescanned with a nondestructive inspection device in accordance with an illustrative embodiment.

FIG. 9 is an illustration of the projection of data from a rescan of part inconsistency 12 of FIG. 8 being rescanned with nondestructive inspection device 14 in accordance with an illustrative embodiment. Once part inconsistency 12 is reworked, part inconsistency rework area 32 may be rescanned using nondestructive inspection device 14. The second scan may be used to verify the rework to part inconsistency 12 was effective and part fragment 26 is usable. If the second scan shows the rework was insufficient to correct part inconsistency 12, a second image produced by the second scan may be reviewed by the same or another programmable device. The second scan may be viewed with an overlay of edited image 18A to determine why the first rework was insufficient and/or to identify a second rework respecting injection locations 28 of the first rework.

Figure 10:
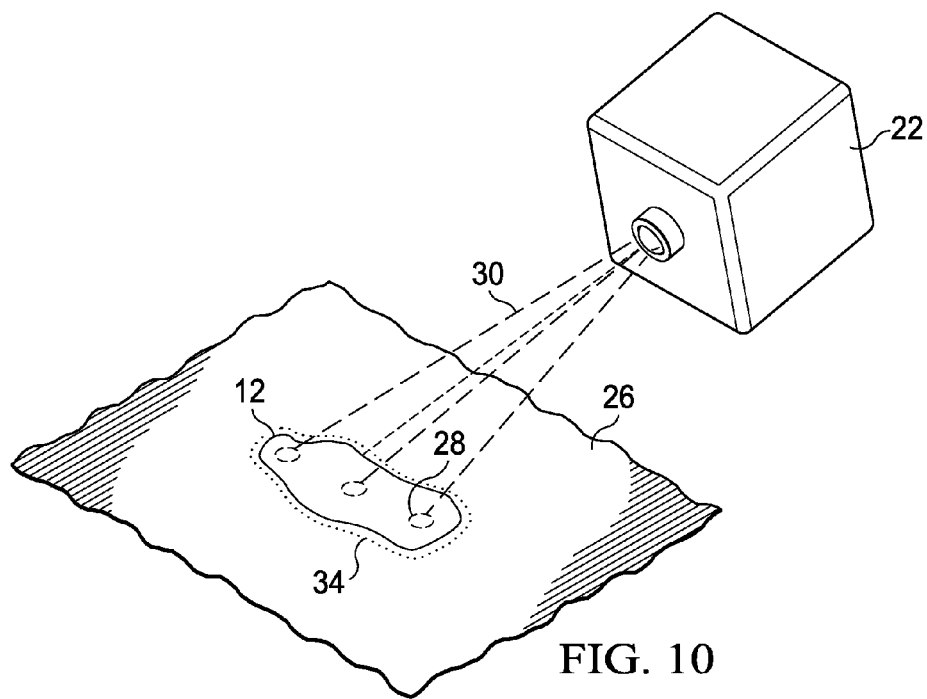
FIG. 10 is an illustration of a second edited image projected onto the part fragment with the laser projector, following the second scan, in accordance with an illustrative embodiment.

FIG. 10 is an illustration of second edited image 34 projected onto part fragment 26 of FIG. 9 with laser projector 22, following the second scan, in accordance with an illustrative embodiment. Second edited image 34 may provide instruction to rework part inconsistency 12. Second edited image 34 may also include injection locations 28 from the first rework to inform/remind the technicians of the work previously performed on part inconsistency 12.

Image 18 may be scanned using recognizable and repeatable data points to allow edited image 18A to be projected in substantially the same location. Image 18 may be scanned using aircraft coordinates or may be translated into aircraft coordinates after scanning. Injection locations 28 may be located using aircraft coordinates so that the rework is performed with precision. Image 18 may also be scanned using one or more reference points. The reference points may be retained within image 18 to allow the edited image to be projected in substantially the same location. The reference points may include a seam of an object.

In the illustrative example, second edited image 34 may also provide an ability to make a comparison of the original inconsistency with any remaining inconsistency that may be present after repair and another scan.

Figure 11:
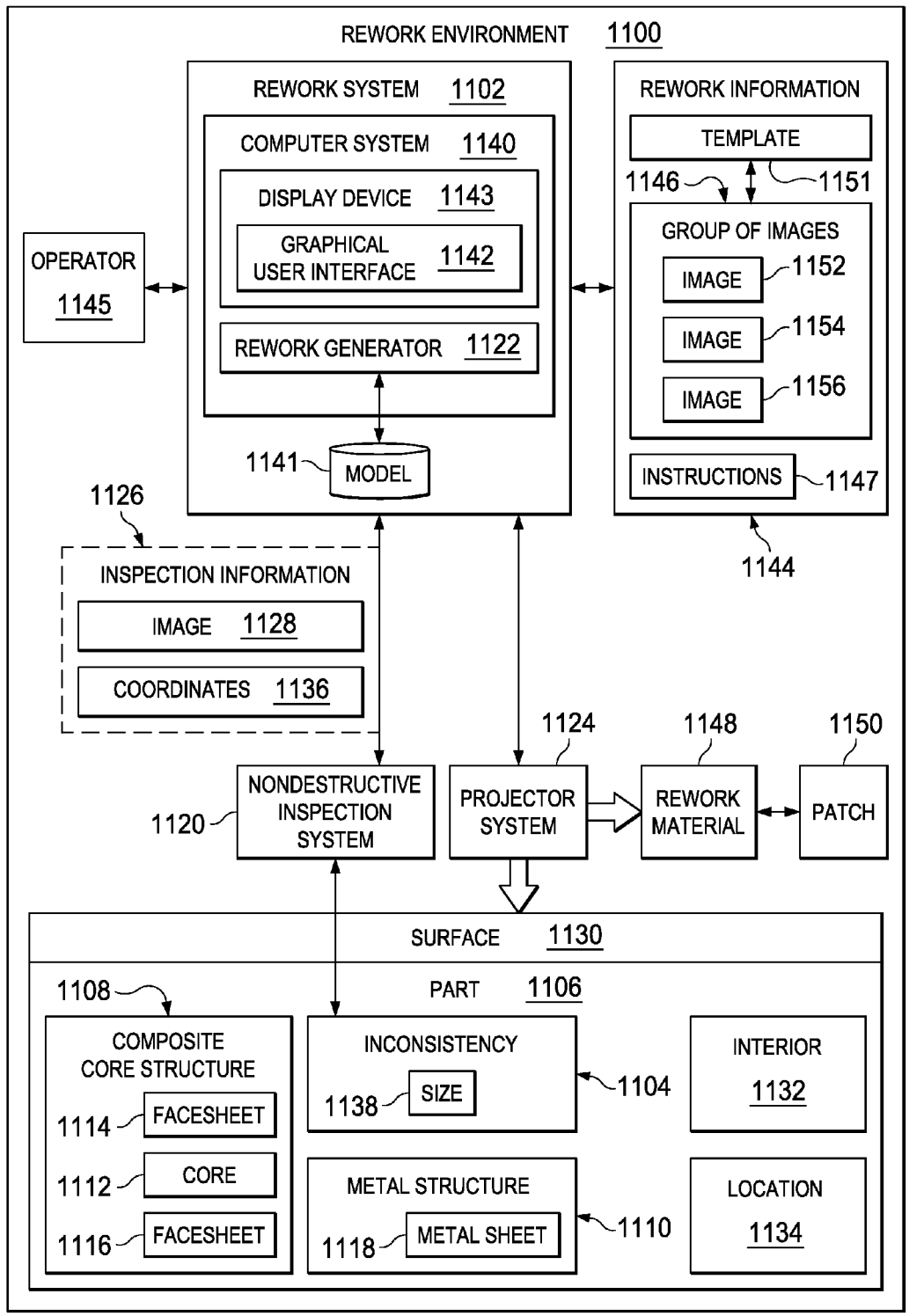
FIG. 11 is an illustration of a rework environment in the form of a block diagram in accordance with an illustrative embodiment.

With reference to FIG. 11, an illustration of a rework environment is depicted in the form of a block diagram in accordance with an illustrative embodiment. In this illustrative example, the different components and processes illustrated in FIGS. 1-10 above may be implemented in rework environment 1100 in the illustrative examples.

As depicted, rework environment 1100 includes rework system 1102. Rework system 1102 may be used to process inconsistency 1104 for part 1106. Part 1106 may be any suitable type of part. For example, part 1106 may be comprised of or include composite core structure 1108, metal structure 1110, or some other suitable type of structure. Composite core structure 1108 may include core 1112 located between facesheet 1114 and facesheet 1116. In this illustrative example, metal structure 1110 may take the form of metal sheet 1118.

As depicted, part 1106 may take various forms. For example, part 1106 may be a skin panel, a wing, a fuselage barrel, a door, a floor panel, a composite sheet, a wall, a stringer, or some other suitable type of part.

As depicted, rework system 1102 may be comprised of a number of different types of components. For example, nondestructive inspection system 1120, rework generator 1122, and projector system 1124 may be included in rework system 1102.

In this illustrative example, nondestructive inspection system 1120 is a hardware system and may include one or more devices. A nondestructive inspection device in nondestructive inspection system 1120 may take various forms. For example, a nondestructive inspection device may be selected from one of an ultrasonic testing system, an eddy current testing system, an x-ray system, a magnetic resonance system, and a microwave testing system, or other suitable types of nondestructive inspection devices.

When more than one device is present in nondestructive inspection system 1120, different types of nondestructive inspection devices may be present. For example, one device may be the camera and a second device may be an ultrasound inspection device.

In this illustrative example, nondestructive inspection system 1120 is configured to generate inspection information 1126. Inspection information 1126 may include information about inconsistency 1104. In this illustrative example, inspection information 1126 may include image 1128 of inconsistency 1104.

When more than one device is present in nondestructive inspection system 1120, different types of information may be present in inspection information 1126. For example, a camera in nondestructive inspection system 1120 may generate visible light images and an ultrasound inspection device in nondestructive inspection system 1120 may generate images from sound signals.

In these illustrative examples, inconsistency 1104 may be located in at least one of surface 1130 or interior 1132 of part 1106 in location 1134 of part 1106.

In addition to image 1128 of inconsistency 1104, inspection information 1126 also may include coordinates 1136. Coordinates 1136 may describe location 1134 as well as other information such as size 1138 of inconsistency 1104. Size 1138 may be in two dimensions or three dimensions depending on the particular implementation.

In this illustrative example, nondestructive inspection system 1120 sends inspection information 1126 to rework generator 1122. Rework generator 1122 is hardware and may include software.

Rework generator 1122 may be implemented in software, hardware, firmware or a combination thereof. When software is used, the operations performed by rework generator 1122 may be implemented in program code configured to run on a processor unit. When firmware is used, the operations performed by rework generator 1122 may be implemented in program code and data and stored in persistent memory to run on a processor unit. When hardware is employed, the hardware may include circuits that operate to perform the operations in rework generator 1122.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, rework generator 1122 may be implemented in computer system 1140. Computer system 1140 may include one or more computers. When more than one computer is present, those computers may be in communication with each other using a communications medium such as a network.

In this illustrative example, rework generator 1122 may be in a remote location to nondestructive inspection system 1120. In other illustrative examples, these two components may be located in the same location.

Rework generator 1122 may place inconsistency 1104 into model 1141 of part 1106. In the illustrative examples, model 1141 may be, for example, a computer-aided design model.

In this illustrative example, coordinates 1136 describing inconsistency 1104 in inspection information 1126 may be used to incorporate a representation of inconsistency 1104 into model 1141. In this manner, model 1141 may be displayed on graphical user interface 1142 on display device 1143 in computer system 1140. The display of model 1141 for part 1106 includes a display of inconsistency 1104 and part 1106.

With this display, rework information 1144 may be generated. This rework information may be generated by operator 1145 interacting with rework generator 1122 through graphical user interface 1142.

As depicted, rework generator 1122 generates rework information 1144 for use in performing rework on part 1106. In this illustrative example, rework information 1144 may include at least one of group of images 1146, instructions 1147, or other suitable information.

As used herein, "a group of," when used with reference to items, means one or more items. For example, group of images 1146 is one or more images. Group of images 1146 may be used as template 1151 for performing rework. In this illustrative example, rework generator 1122 may be in a remote location to nondestructive inspection system 1120. In other illustrative examples, these two components may be located in the same location.

In the illustrative examples, rework information 1144 may be used to process rework material 1148 to form patch 1150 for use in reworking part 1106 with respect to inconsistency 1104. In particular, projector system 1124 may be used to project rework information 1144 for use in forming patch 1150. In these illustrative examples, projector system 1124 is a hardware system and may include software. Projector system 1124 includes a group of projector devices configured to project images onto a surface. A projector device in projector system 1124 may be selected from one of a laser projector, a light emitting diode projector, a halogen light projector, an incandescent light projector and other suitable types of projector devices.

For example, image 1152 in group of images 1146 may be projected by projector system 1124 onto rework material 1148 as a pattern to generate patch 1150 from one or more pieces of rework material 1148. In other words, image 1152 may define patch 1150 from rework material 1148. The projection of image 1152 is performed under the control of rework generator 1122, operator 1145, or some other suitable controller. In this illustrative example, instructions 1147 may include instructions on generating patch 1150 in the illustrative example.

Additionally, projector system 1124 may project image 1154 from group of images 1146 onto surface 1130 of part 1106 under the control of rework generator 1122 in this illustrative example. Of course, in other illustrative examples, operator 1145 may control the projection of image 1154. Image 1154 may be used as a template to perform rework on inconsistency 1104 in part 1106. For example, image 1154 may be used as a template from which a portion of part 1106 may be removed. The portion may be removed to form, for example, a scarf, holes, or other features for performing the rework on part 1106. Further, image 1152 may be also used to place patch 1150 onto part 1106.

Image 1156 also may be projected onto part 1106 by projector system 1124 to verify whether the rework has been performed as desired. The projection of image 1156 may be performed under the control of rework generator 1122, operator 1145, or some other suitable controller. For example, image 1156 may be an image of inconsistency 1104. The projection of image 1156 onto surface 1130 of part 1106 may be used to determine whether patch 1150 covers the area in which inconsistency 1104 was located prior to the rework being performed on part 1106. In another illustrative example, image 1156 may be an outline of the patch in the desired location for the patch. In this manner, a determination may be made as to whether patch 1150 that has been installed has the desired dimensions and location.

The illustration of rework environment 1100 in FIG. 11 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, inspection information 1126 may not include image 1128 in some illustrative examples. Instead, inspection information 1126 may include information that may be used to generate image 1128. In this example, rework generator 1122 may be configured to generate image 1128 from inspection information 1126.

As another illustrative example, inspection information 1126 may include one or more additional images in addition to image 1128. As depicted, these images may be of different types depending on the type of nondestructive inspection devices that may be present in nondestructive inspection system 1120. As another illustrative example, rework information 1144 may be generated by rework generator 1122 without input from operator 1145 in some illustrative examples. For example, rework generator 1122 may include a process that selects or designs patch 1150 for use in performing rework on part 1106.

Turning now to FIGS. 12-17, illustrations of a rework process for a composite core structure are depicted in accordance with illustrative embodiments. These figures illustrate one manner in which a rework may be identified and performed for a composite core structure. As depicted, the composite core structure may be a composite honeycomb core structure.

Figure 12:
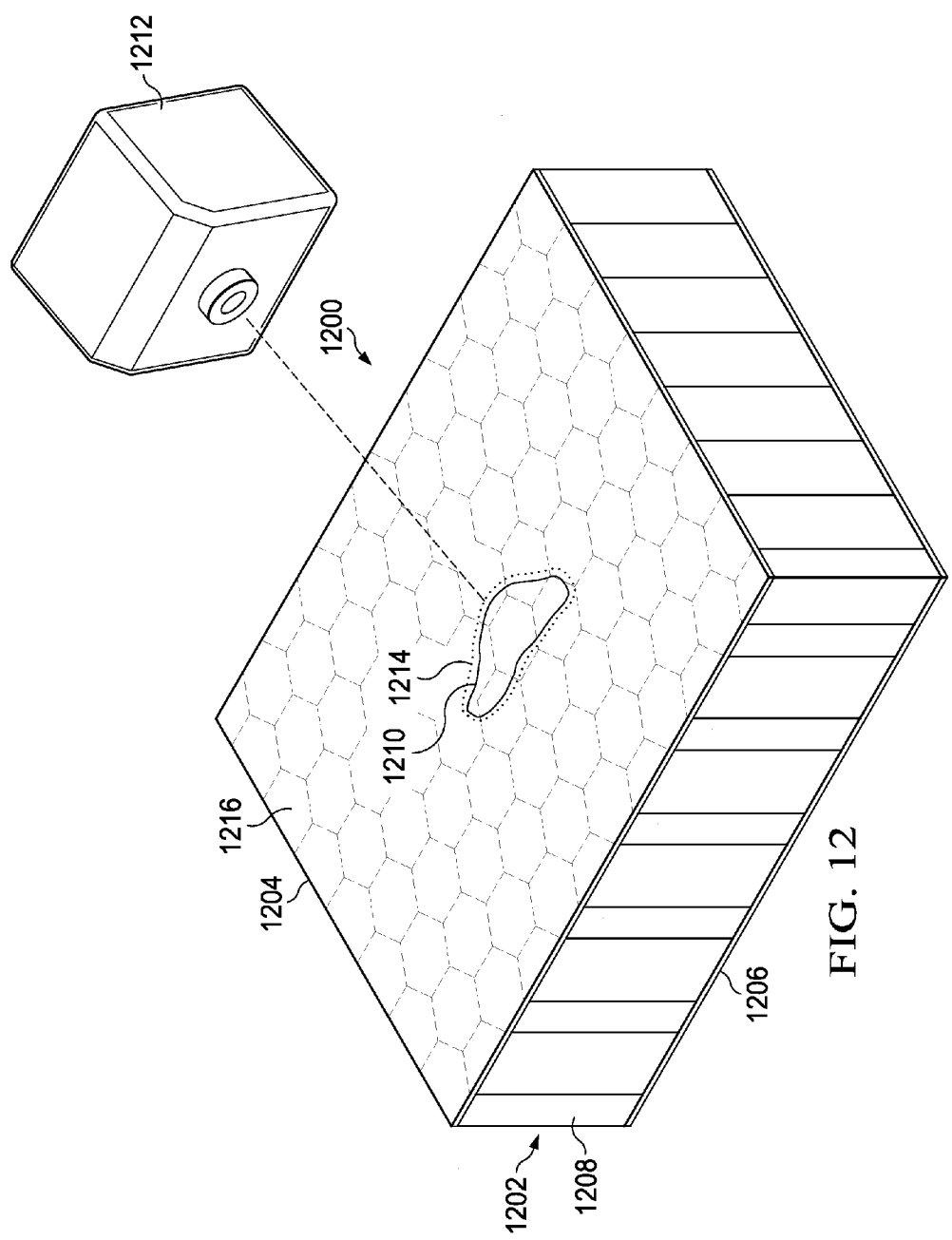
FIG. 12 is an illustration of an inspection of a part with a composite honeycomb core structure in accordance with an illustrative embodiment.

Turning to FIG. 12, an illustration of an inspection of a part with a composite honeycomb core structure is depicted in accordance with an illustrative embodiment. In this illustrative example, part 1200 takes the form of honeycomb core structure 1202. Honeycomb core structure 1202 is an example of an implementation for composite core structure 1108 in FIG. 11. As depicted in this example, honeycomb core structure 1202 is comprised of first facesheet 1204 and second facesheet 1206 with honeycomb core 1208 located between first facesheet 1204 and second facesheet 1206. In this illustrative example, honeycomb core 1208 is shown in phantom under first facesheet 1204.

In this illustrative example, honeycomb core structure 1202 has inconsistency 1210. Inconsistency 1210 is identified using nondestructive inspection device 1212 in this particular example. The use of nondestructive inspection device 1212 to detect the presence of inconsistency 1210 may be considered part of a rework process.

As depicted, this device may be used to determine whether rework is needed for part 1200. As depicted, nondestructive inspection device 1212 is an example of one implementation of a device that may be used in nondestructive inspection system 1120 in FIG. 11.

As depicted, nondestructive inspection device 1212 may perform an ultrasonic inspection of honeycomb core structure 1202. As depicted, nondestructive inspection device 1212 may generate inspection information about honeycomb core structure 1202 and inconsistency 1210. In particular, the inspection information may include images of inconsistency 1210.

Additionally, the inspection of part 1200 also may generate other inspection information. This inspection information may include, for example, coordinates for inconsistency 1210. These coordinates describe inconsistency 1210.

For example, the coordinates may describe the shape, size, location, orientation, and other suitable information about inconsistency 1210. These coordinates may take the form of aircraft coordinates when part 1200 is located in an aircraft. Of course, any coordinate system may be used depending on the particular implementation.

In some illustrative examples, nondestructive inspection device 1212 also may be configured to project image 1214 of inconsistency 1210 onto surface 1216 of part 1200 in some illustrative examples. This projection of image 1214 may provide an operator a better visualization of inconsistency 1210 if inconsistency 1210 is located below surface 1216 of part 1200.

Figure 13:
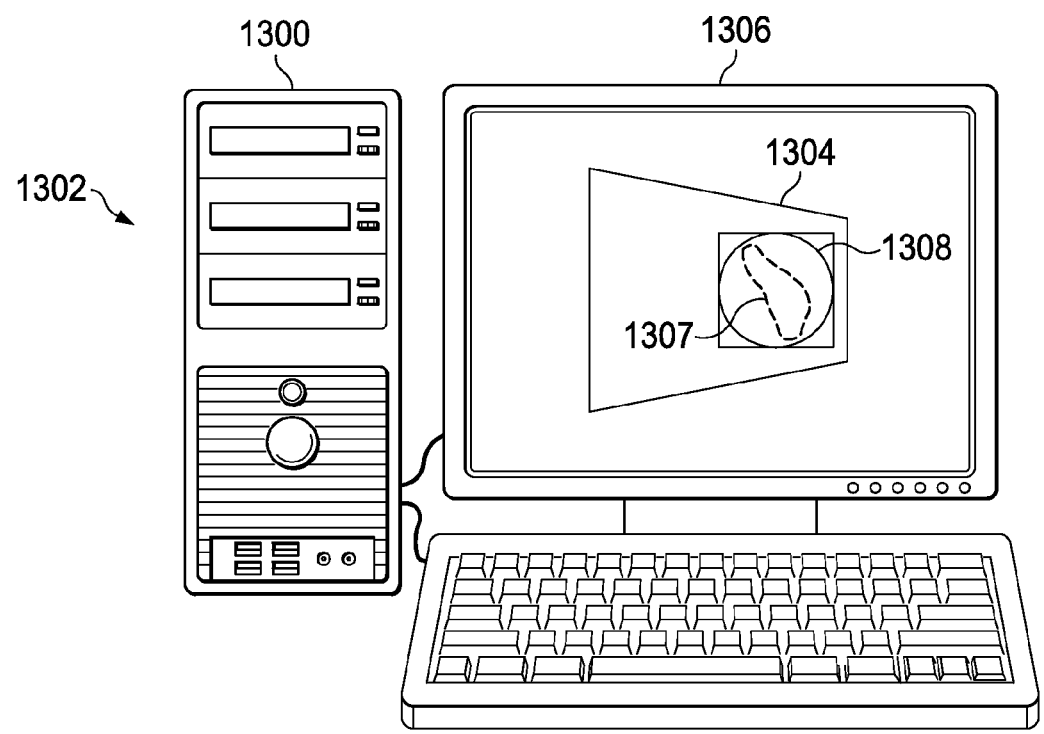
FIG. 13 is an illustration of an inconsistency placed into a model of a part with a composite honeycomb core structure in accordance with an illustrative embodiment.

Next, in FIG. 13, an illustration of an inconsistency placed into a model of a part with a composite honeycomb core structure is depicted in accordance with an illustrative embodiment. In this illustrative example, rework generator 1300 is implemented in computer system 1302. Rework generator 1300 displays model 1304 of part 1200 in FIG. 12 on display device 1306 in computer system 1302.

As depicted, inconsistency 1210 is shown on model 1304 of part 1200 as graphical representation 1307. In particular, coordinates describing inconsistency 1210 are integrated into model 1304. The coordinates reflect the shape, size, location, and orientation of inconsistency 1210 in part 1200. In this manner, inconsistency 1210 may be integrated into model 1304 and displayed on model 1304 on display device 1306. In this illustrative example, rework information is identified.

Area 1308 defines the rework for honeycomb core structure 1202. This area may be used to form a patch for reworking part 1200.

As depicted, area 1308 is a circle around inconsistency 1210 shown on model 1304 on display device 1306. In this illustrative example, area 1308 encompasses inconsistency 1210 as displayed on model 1304.

In the illustrative example, rework generator 1300 creates an image of area 1308. Also, rework generator 1300 identifies coordinates for area 1308. In the illustrative examples, the coordinates may be coordinates for part 1200 or an object in which part 1200 is located. For example, if part 1200 is used on an aircraft, the coordinates may be aircraft coordinates for the aircraft.

The image of area 1308, the coordinates, and instructions may be used to form rework information for performing rework on honeycomb core structure 1202. With this rework information, a rework of part 1200 may be performed.

Figure 14:
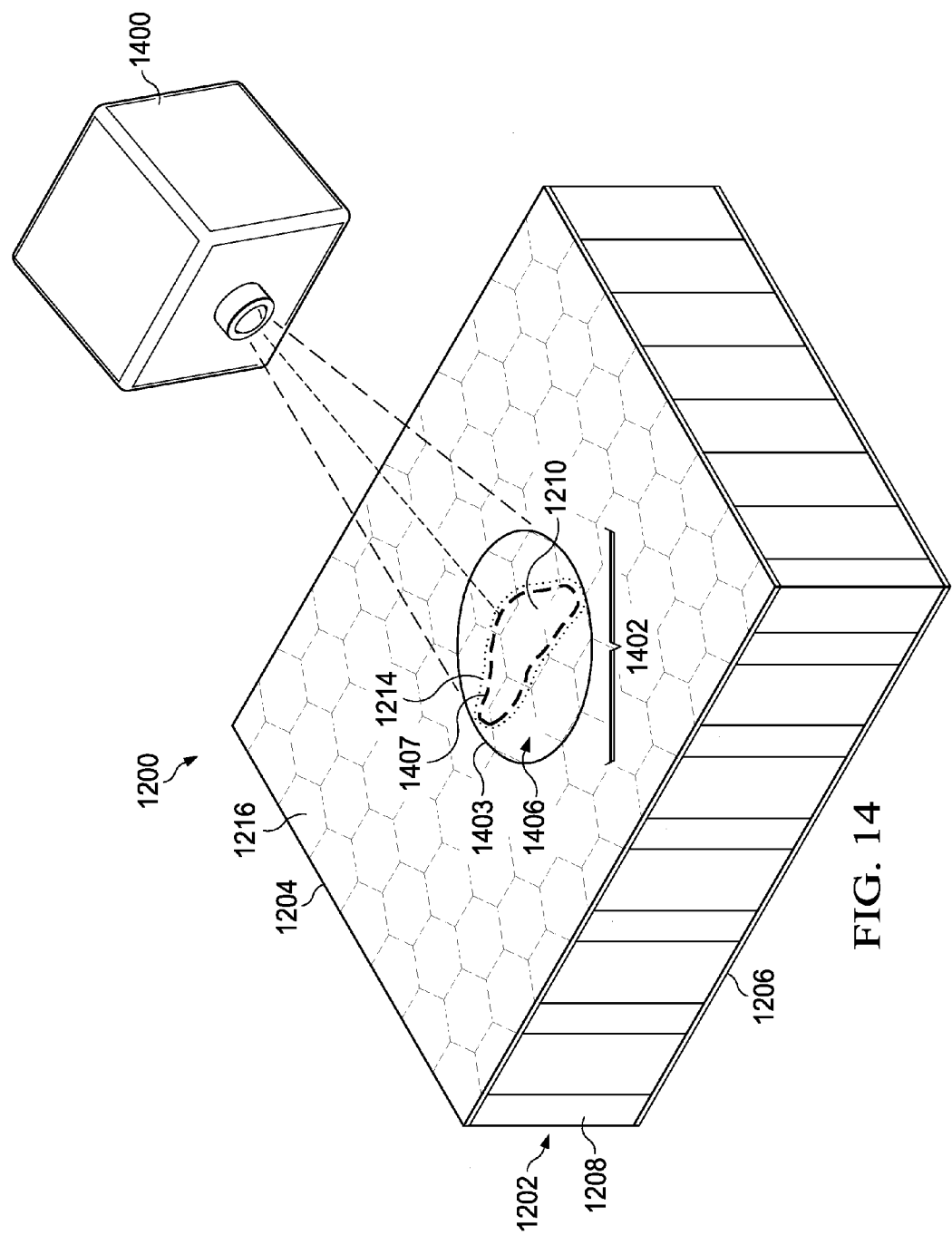
FIG. 14 is an illustration of a projection of an image for reworking a composite honeycomb core structure in accordance with an illustrative embodiment.

Turning now to FIG. 14, an illustration of a projection of an image for reworking a composite honeycomb core structure is depicted in accordance with an illustrative embodiment. In this illustrative example, projector 1400 projects image 1402 onto surface 1216 of honeycomb core structure 1202. As depicted, projector 1400 is an example of a device that may be used in projector system 1124 shown in block form in FIG. 11. In this illustrative example, image 1402 includes circle 1403.

The location of image 1402 on surface 1216 is based on coordinates identified for the image in model 1304 of part 1200. Further, image 1402 may be sized based on the coordinates identified in the image of the model. The sizing of image 1402 is such that the image represents the rework area as accurately as desired with respect to dimensions and location of image 1402 when projected onto surface 1216 of part 1200.

In this illustrative example, circle 1403 in image 1402 defines area 1308 in FIG. 13. Circle 1403 defines area 1406 on surface 1216 for performing rework on part 1200. Further, image 1402 also may include a display of inconsistency 1210. In this illustrative example, the display of inconsistency 1210 takes the form of outline 1407. This display may be especially useful when inconsistency 1210 is located below surface 1216 of part 1200.

As can be seen, image 1214 is displayed in the appropriate location on surface 1216 of honeycomb core structure 1202 in part 1200 to perform the rework operations. In this manner, image 1214 may be used as a template or pattern to remove portions of honeycomb core structure 1202 in part 1200. The template provided using image 1214 does not require contact or materials to be placed onto part 1200. In other words, stencils, mylar sheets, and other physical components are not needed to perform the rework in this illustrative example.

Figure 15:
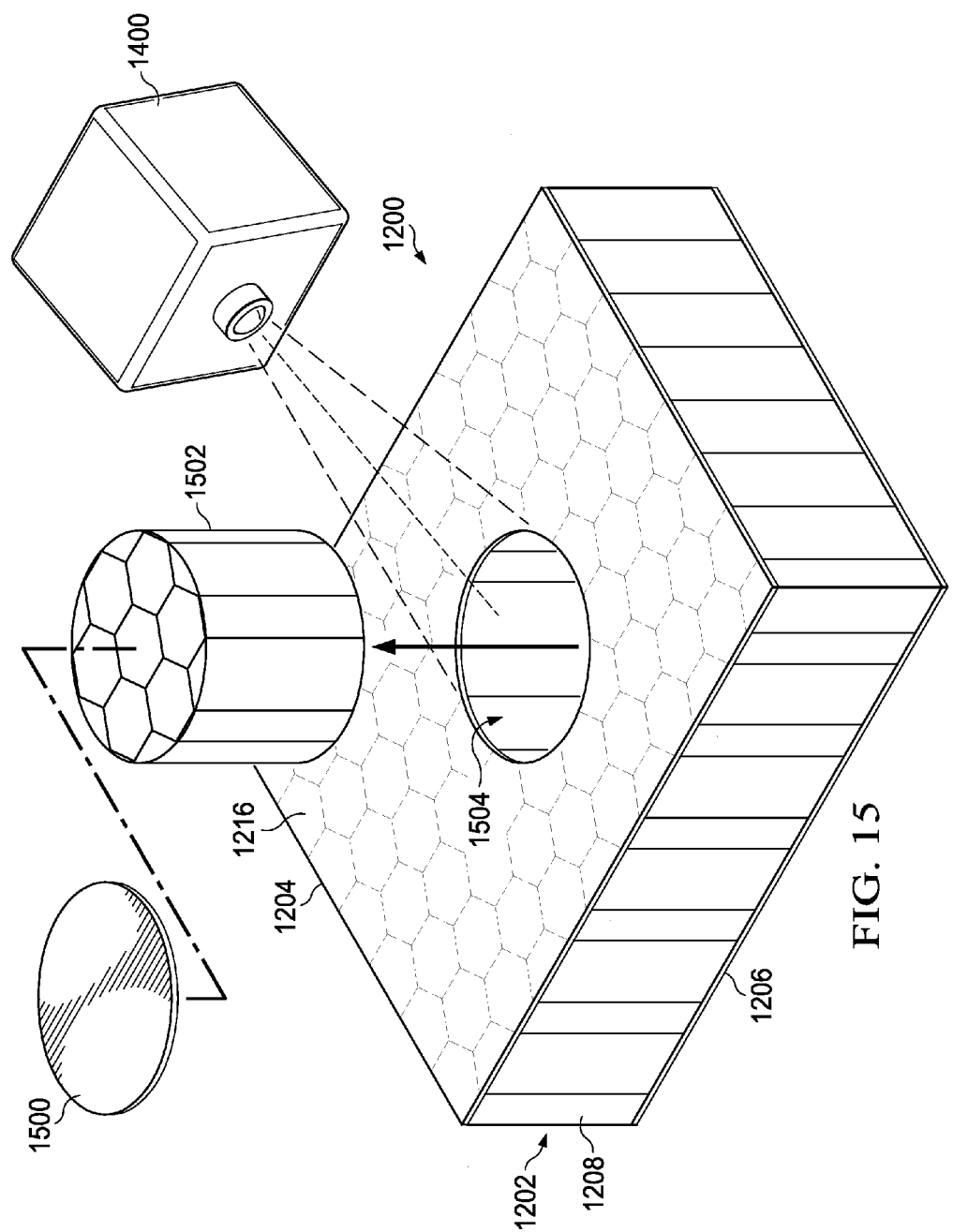
FIG. 15 is an illustration of a removal of a portion of a composite honeycomb core structure in accordance with an illustrative embodiment.

With reference next to FIG. 15, an illustration of a removal of a portion of a composite honeycomb core structure is depicted in accordance with an illustrative embodiment. In this illustration, portion 1500 of first facesheet 1204 of honeycomb core structure 1202 in part 1200 has been removed. Portion 1500 is removed based on the projection of image 1402. Additionally, portion 1502 of honeycomb core 1208 is also removed in this illustrative example, leaving channel 1504.

The cross-section for channel 1504 in honeycomb core structure 1202 is a circle corresponding to image 1214 as displayed on surface 1216 of honeycomb core structure 1202 by projector 1400 in FIG. 14. Of course, in some cases, only portion 1500 of first facesheet 1204 may be removed depending on the extent of inconsistency 1210.

Figure 16:
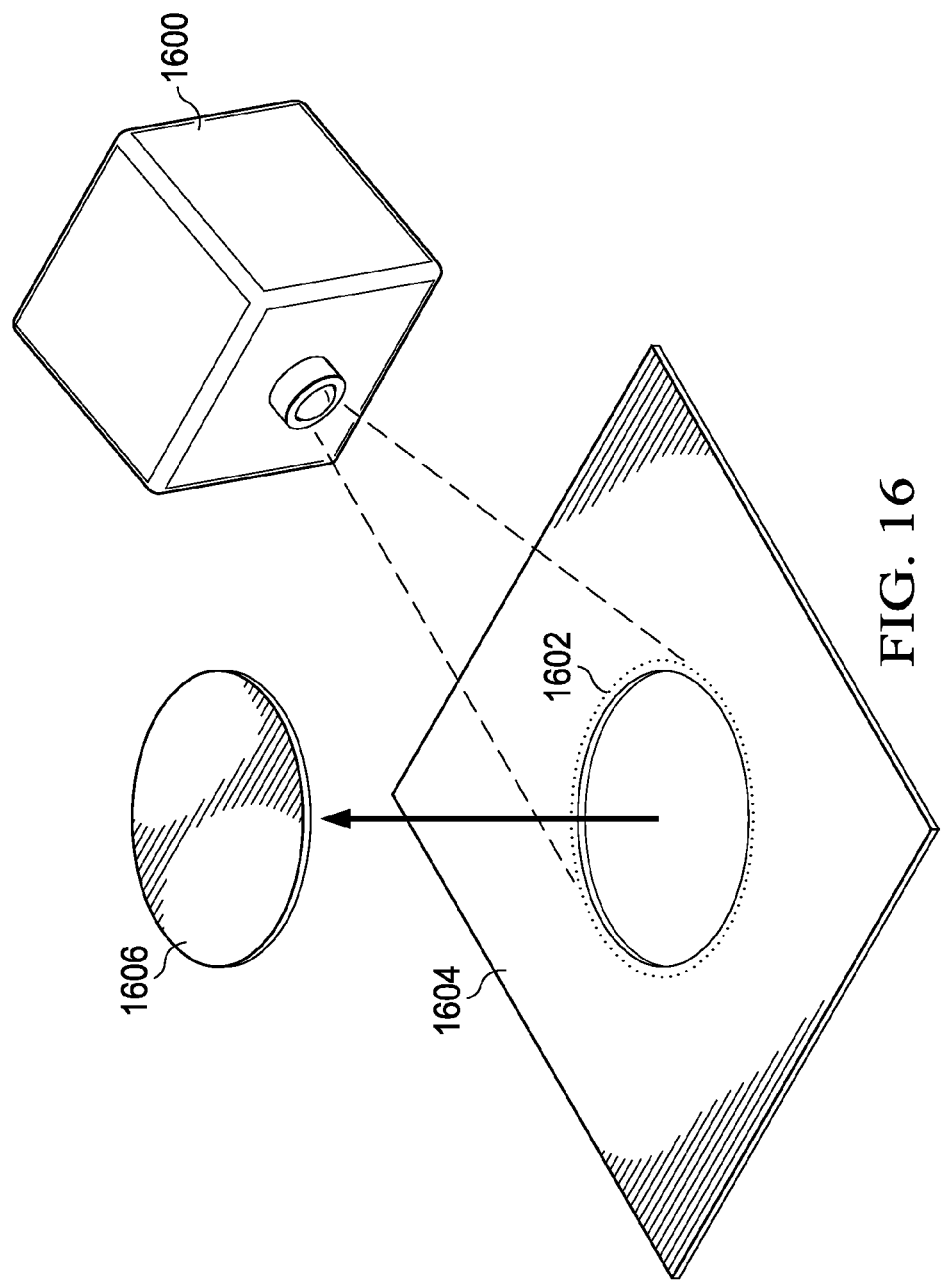
FIG. 16 is an illustration of the formation of a portion of a patch in accordance with an illustrative embodiment.

Turning next to FIG. 16, an illustration of the formation of a portion of a patch is depicted in accordance with an illustrative embodiment. In this illustrative example, projector 1600 projects image 1602 onto sheet of rework material 1604. Image 1602 may be used as a template.

As depicted, portion 1606 is cut out of sheet of rework material 1604 based on the pattern in the template generated by image 1602 projected onto sheet of rework material 1604. In this manner, stencils, contact paper, and physical templates may be avoided.

Portion 1606 forms a portion of a patch for reworking honeycomb core structure 1202. In this example, portion 1606 is a replacement for portion 1500 removed from first facesheet 1204 in FIG. 15.

Figure 17:
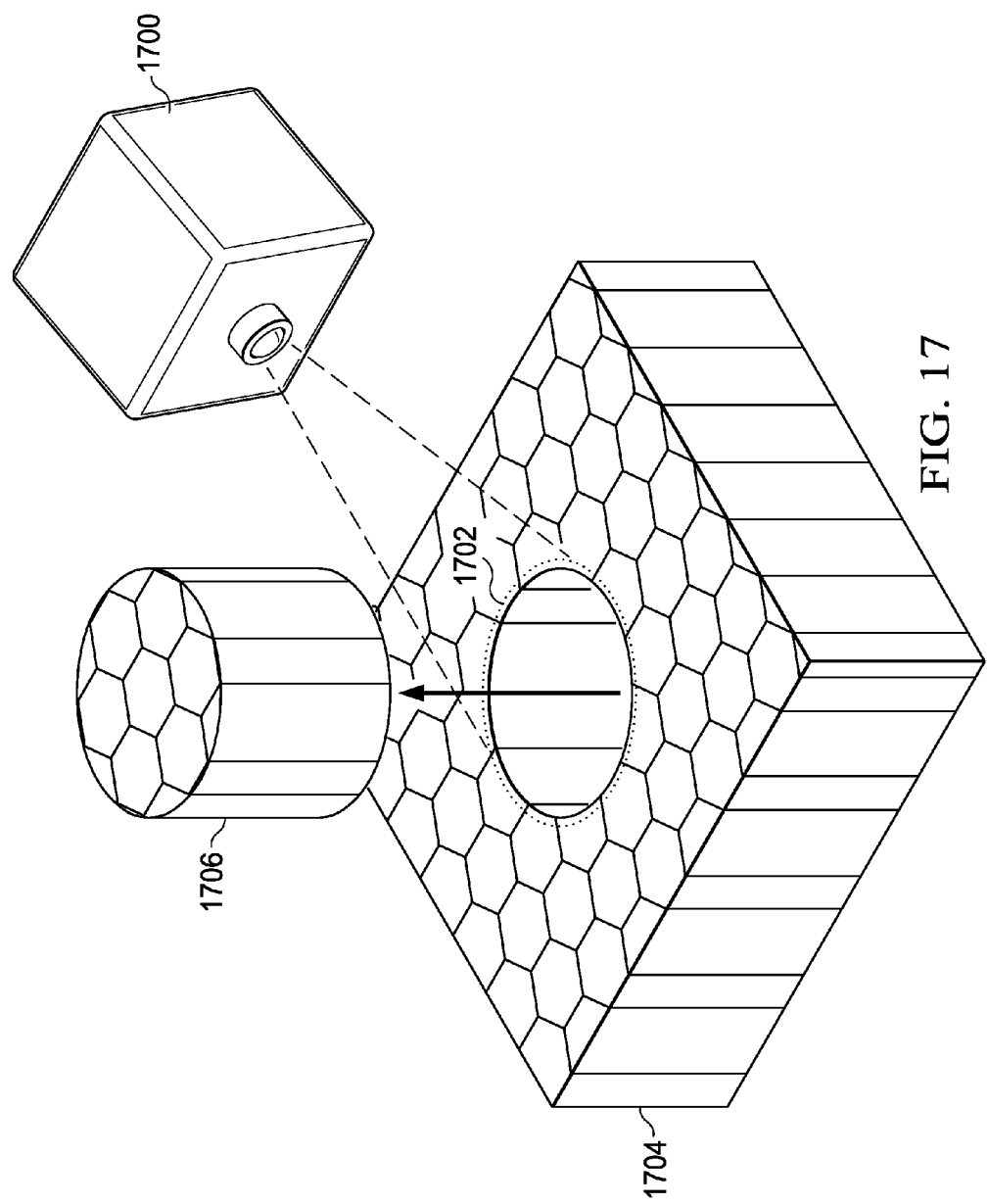
FIG. 17 is another illustration of the formation of a portion of a patch in accordance with an illustrative embodiment.

With reference next to FIG. 17, another illustration of the formation of a portion of a patch is depicted in accordance with an illustrative embodiment. As depicted, projector 1700 projects image 1702 onto honeycomb core material 1704. With image 1702 as a template, portion 1706 of honeycomb core material 1704 in part 1200 is removed. Portion 1706 forms another part of a patch for use in reworking honeycomb core structure 1202. As depicted, portion 1706 is a replacement for portion 1502 of honeycomb core 1208 removed from honeycomb core structure 1202 in FIG. 15.

Figure 18:
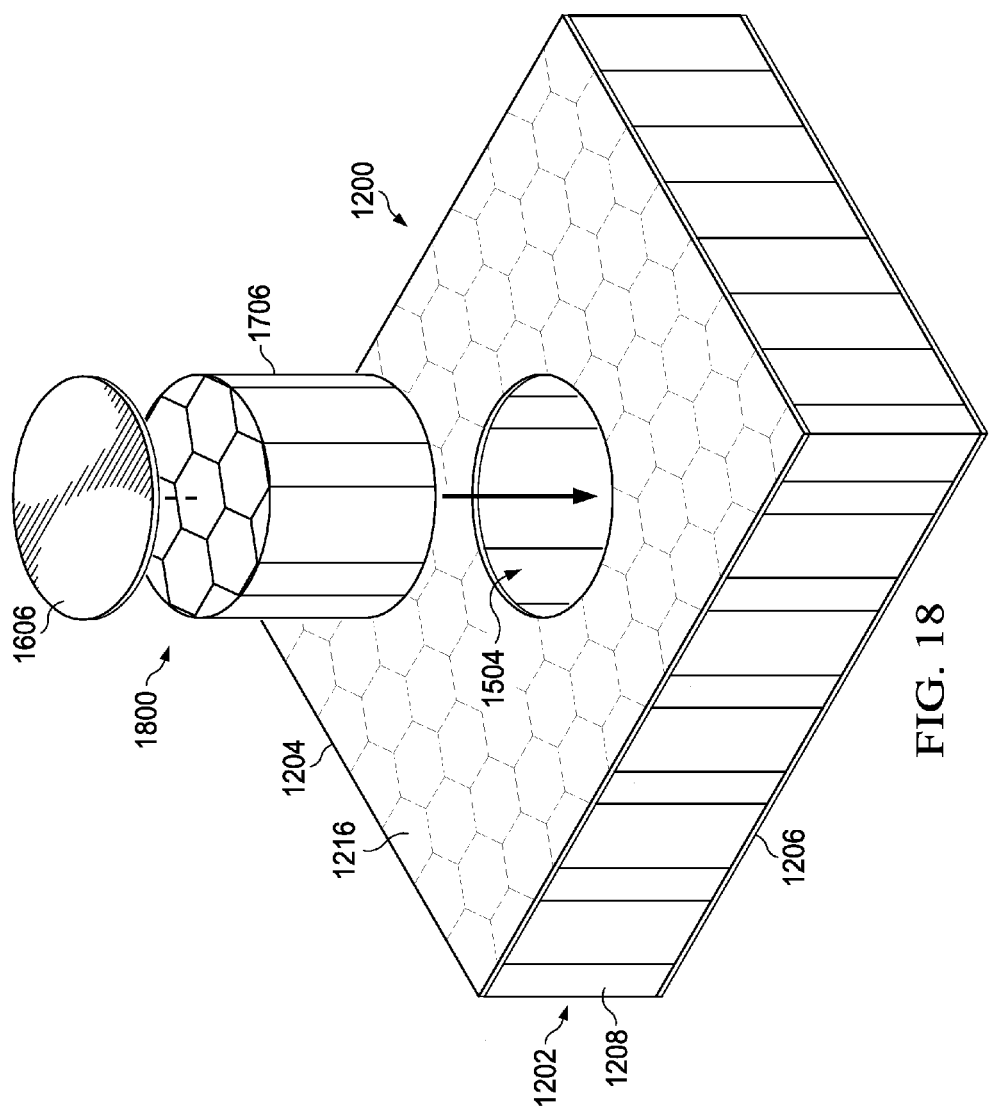
FIG. 18 is an illustration of reworking a part with a honeycomb core structure in accordance with an illustrative embodiment.

Turning next to FIG. 18, an illustration of reworking a part with a honeycomb core structure is depicted in accordance with an illustrative embodiment. In this illustrative example, portion 1606 and portion 1706 form patch 1800 for use in performing rework on honeycomb core structure 1202 in part 1200. As depicted, portion 1606 and portion 1706 for patch 1800 may be placed into channel 1504 bonded in with adhesive or other materials to other portions of honeycomb core structure 1202 for part 1200.

Figure 19:
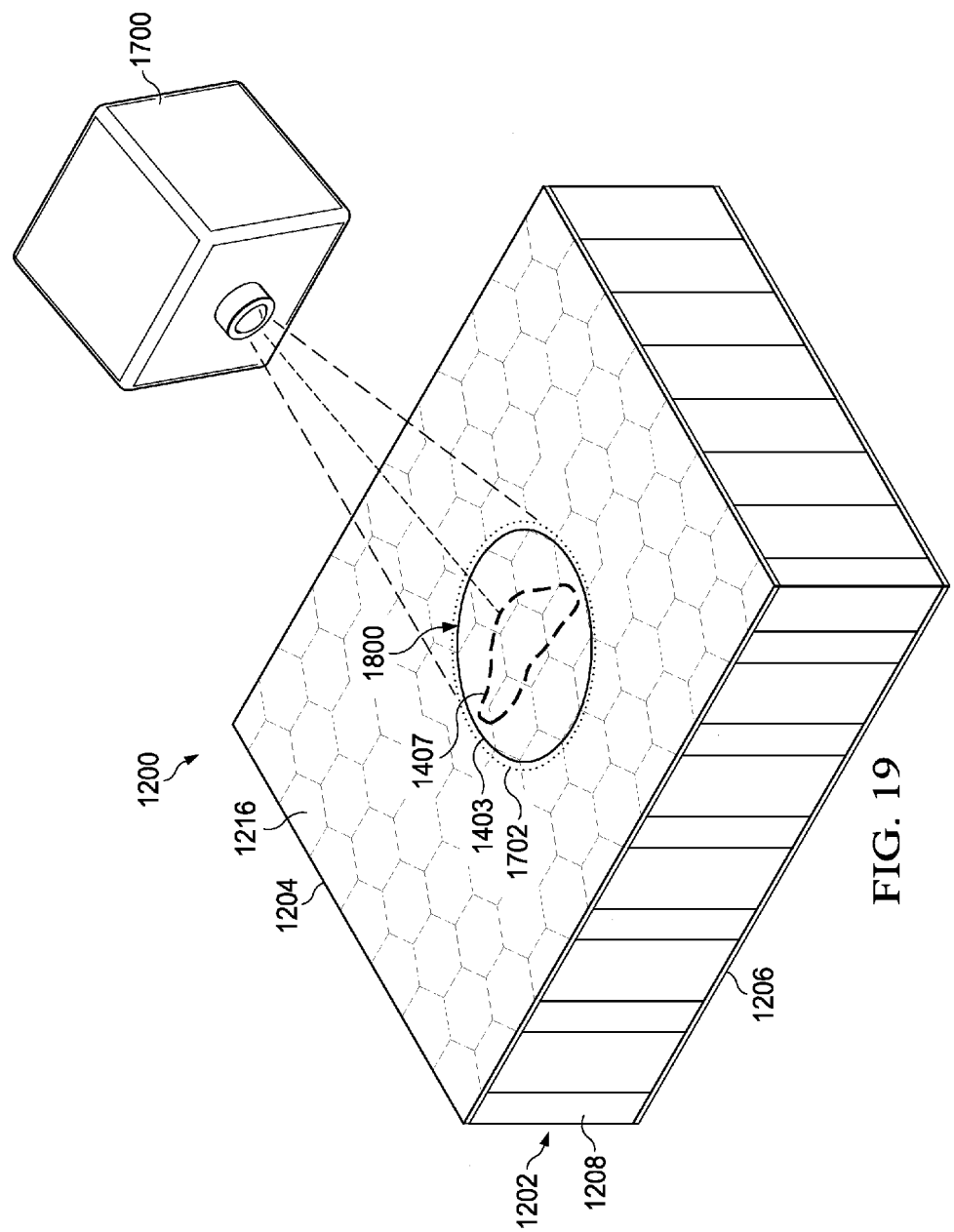
FIG. 19 is an illustration of a verification of rework on a honeycomb core structure in accordance with an illustrative embodiment.

With reference next to FIG. 19, an illustration of a verification of rework on a honeycomb core structure is depicted in accordance with an illustrative embodiment. In this illustrative example, projector 1700 projects image 1702 onto surface 1216 of first facesheet 1204 of honeycomb core structure 1202 in part 1200. As depicted, image 1702 includes circle 1403 for patch 1800 and outline 1407 of inconsistency 1210 from FIG. 11.

In this illustrative example, image 1702 is displayed in the location in which the inconsistency 1210 was located prior to the rework being performed on honeycomb core structure 1202. In this manner, a confirmation may be made as to whether patch 1800 was placed in the desired location. As a result, the rework of inconsistency 1210 may be inspected using image 1702 of inconsistency 1210 projected onto honeycomb core structure 1202.

With reference next to FIGS. 20-25, illustrations of a rework process for a metal structure are depicted in accordance with illustrative embodiments. These figures illustrate an example of one manner in which a rework may be performed for a metal structure.

Figure 20:
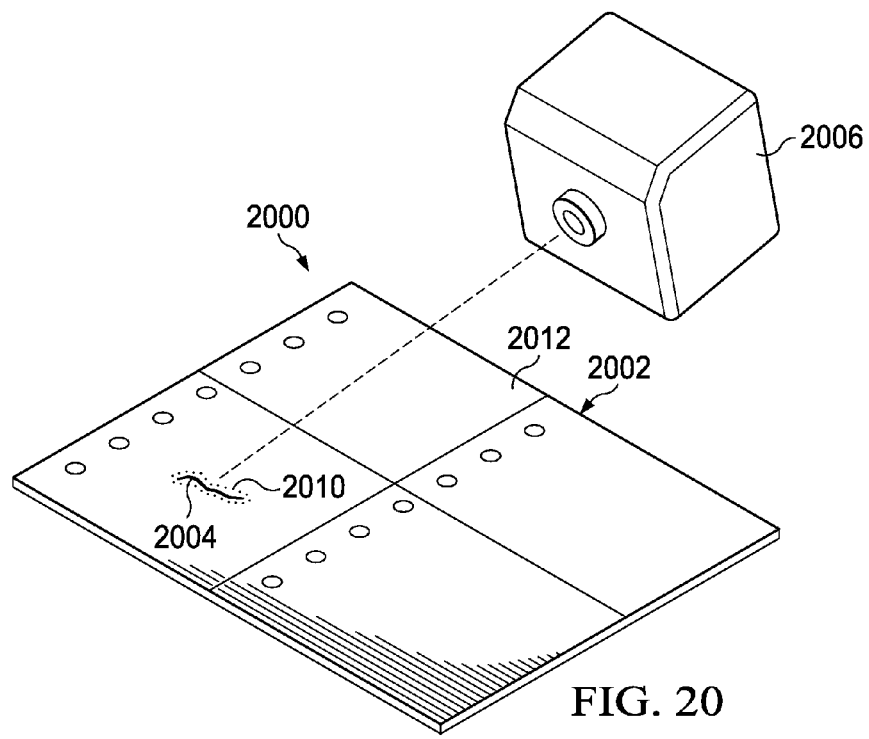
FIG. 20 is an illustration of inspection of a metal structure in accordance with an illustrative embodiment.

Turning first to FIG. 20, an illustration of inspection of a metal structure is depicted in accordance with an illustrative embodiment. In this depicted example, part 2000 includes metallic structure 2002 and inconsistency 2004. Inconsistency 2004 takes the form of a crack in this particular example.

As depicted, nondestructive inspection device 2006 is used to perform an inspection of metallic structure 2002 for part 2000. Nondestructive inspection device 2006 is another example of an implementation for a device that may be used in nondestructive inspection system 1120 in FIG. 11. This inspection may be performed as part of an in-service inspection process when metallic structure 2002 is used in an aircraft.

In this illustrative example, nondestructive inspection device 2006 may be implemented in at least one of a current testing or ultrasonic testing to generate inspection information about part 2000 with inconsistency 2004. Nondestructive inspection device 2006 is configured to generate one or more images of inconsistency 2004 in metallic structure 2002 in part 2000.

Additionally, the inspection of part 2000 also may generate other inspection information. This inspection information may include, for example, coordinates for inconsistency 2004. These coordinates describe inconsistency 2004 in metallic structure 2002. For example, the coordinates may describe the shape, size, location, orientation, and other suitable information about inconsistency 2004.

In some illustrative examples, image 2010 of inconsistency 2004 may be projected onto surface 2012 of metallic structure 2002 for part 2000. Image 2010 may provide a better view of the location of inconsistency 2004 to an operator in the illustrative examples. Image 2010 may be especially useful if inconsistency 2004 is not visible to the operator.

Figure 21:
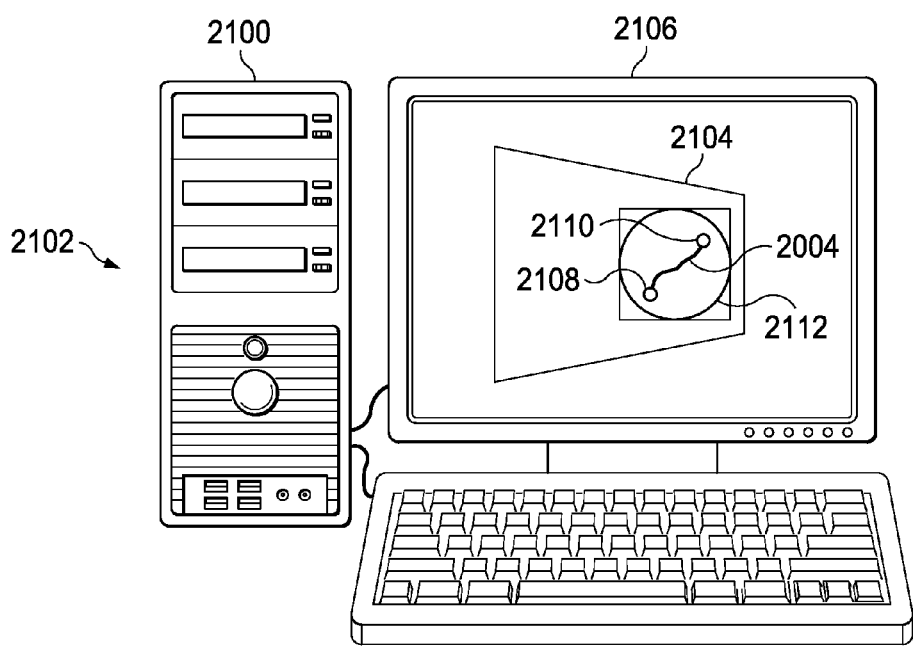
FIG. 21 is an illustration of an inconsistency placed into a model of a part in accordance with an illustrative embodiment.

Turning next to FIG. 21, an illustration of an inconsistency placed into a model of a part is depicted in accordance with an illustrative embodiment. In this illustrative example, rework generator 2100 is implemented in computer system 2102. As depicted, rework generator 2100 displays model 2104 of part 2000 from FIG. 21 on display device 2106 in computer system 2102.

In this depicted example, inconsistency 2004 is shown as being displayed on model 2104 of part 2000 on display device 2106. In particular, the display of inconsistency 2004 in the display of model 2104 is based on the coordinates of inconsistency 2004 identified during the inspection of metallic structure 2002.

In this illustrative example, rework information may be identified using the display of inconsistency 2004 as displayed on model 2104 of part 2000. As seen in this illustrative example, hole 2108 and hole 2110 are placed at the ends of inconsistency 2004. Hole 2108 and hole 2110 are included as part of the rework of inconsistency 2004 to reduce the possibility that inconsistency 2004 may spread or become larger. These holes may be stop holes in some illustrative examples. Additionally, area 2112 is defined as an area in which rework is to be performed on part 2000.

As depicted, hole 2108, hole 2110, and area 2112 may be used to form an image for performing rework. In particular, coordinates for these features may be included as part of the image for use in projecting the image onto part 2000. In the illustrative examples, these coordinates may take the form of aircraft coordinates.

Figure 22:
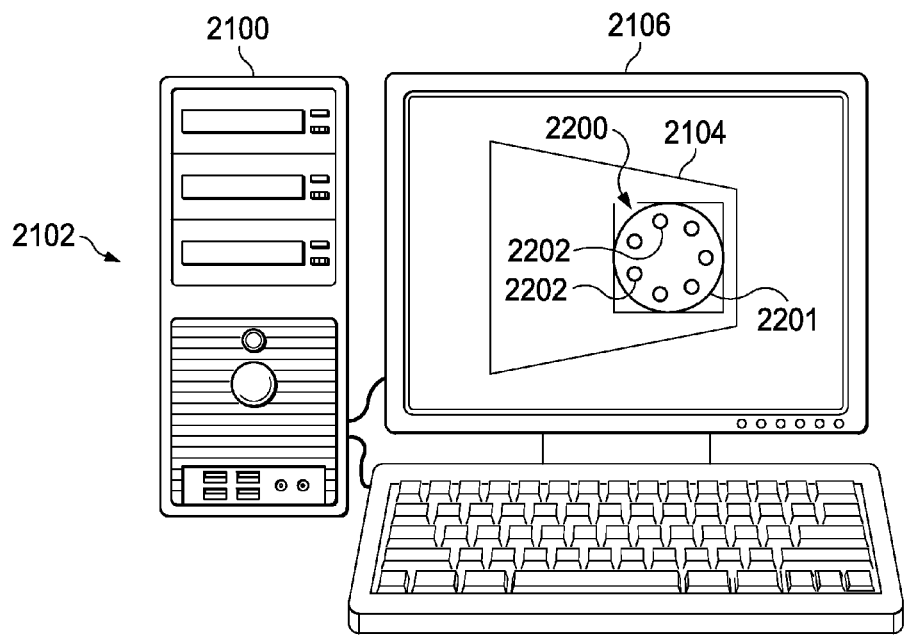
FIG. 22 is an illustration of the creation of rework information in accordance with an illustrative embodiment.

With reference now to FIG. 22, an illustration of the creation of rework information is depicted in accordance with an illustrative embodiment. In this illustrative example, rework generator 2100 is configured to generate rework information such as graphical representation 2200 for a patch as displayed on model 2104 of part 2000. In this illustrative example, area 2201 with holes 2202 may be a patch for placement over inconsistency 2004 on part 2000. These holes may be used to install fasteners, such as bolts or other suitable types of fasteners.

In the illustrative examples, the rework information generated by rework generator 2100 may include images. These images may include, for example, an image of area 2112 with hole 2108 and hole 2110. As another example, an image of graphical representation 2200 and holes 2202 in FIG. 22 also may be included as part of the rework information to create a patch for performing rework on part 2000.

The rework information generated also may include instructions. These instructions may include instructions for forming the holes and for creating and installing the patch on part 2000. In particular, the images may include an arrangement of holes for fasteners to secure a patch.

Figure 23:
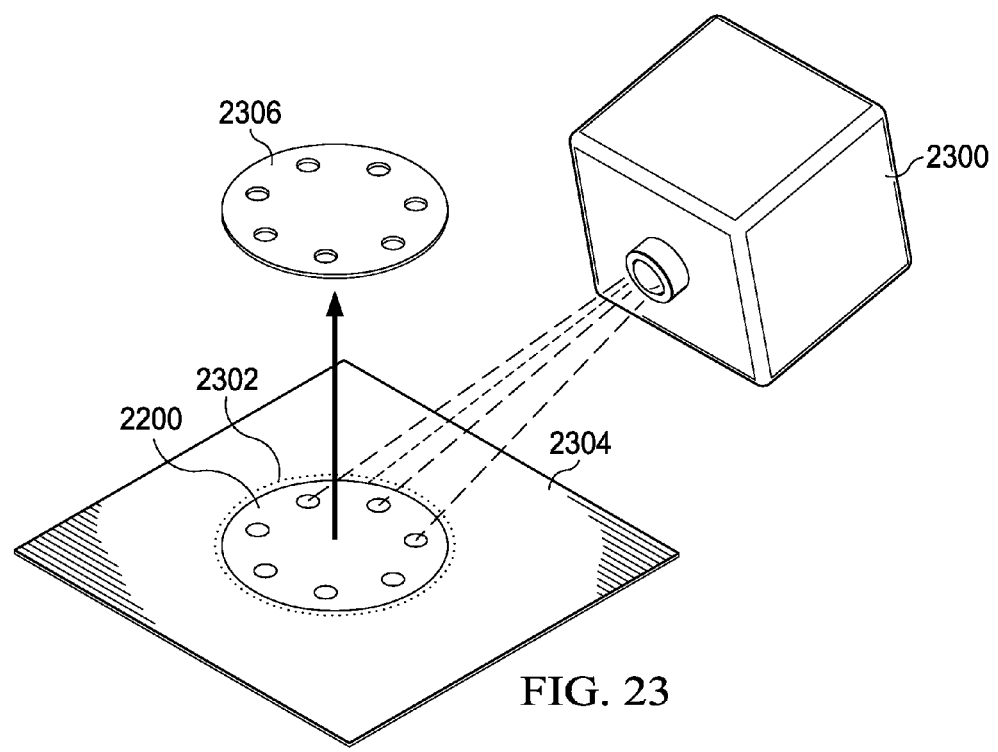
FIG. 23 is an illustration of the formation of a patch in accordance with an illustrative embodiment.

With reference now to FIG. 23, an illustration of the formation of a patch is depicted in accordance with an illustrative embodiment. In this depicted example, projector 2300 projects image 2302 with graphical representation 2200 onto metal rework material 2304. Image 2302 with graphical representation 2200 may be used as a template to form patch 2306 in this illustrative example.

Figure 24:
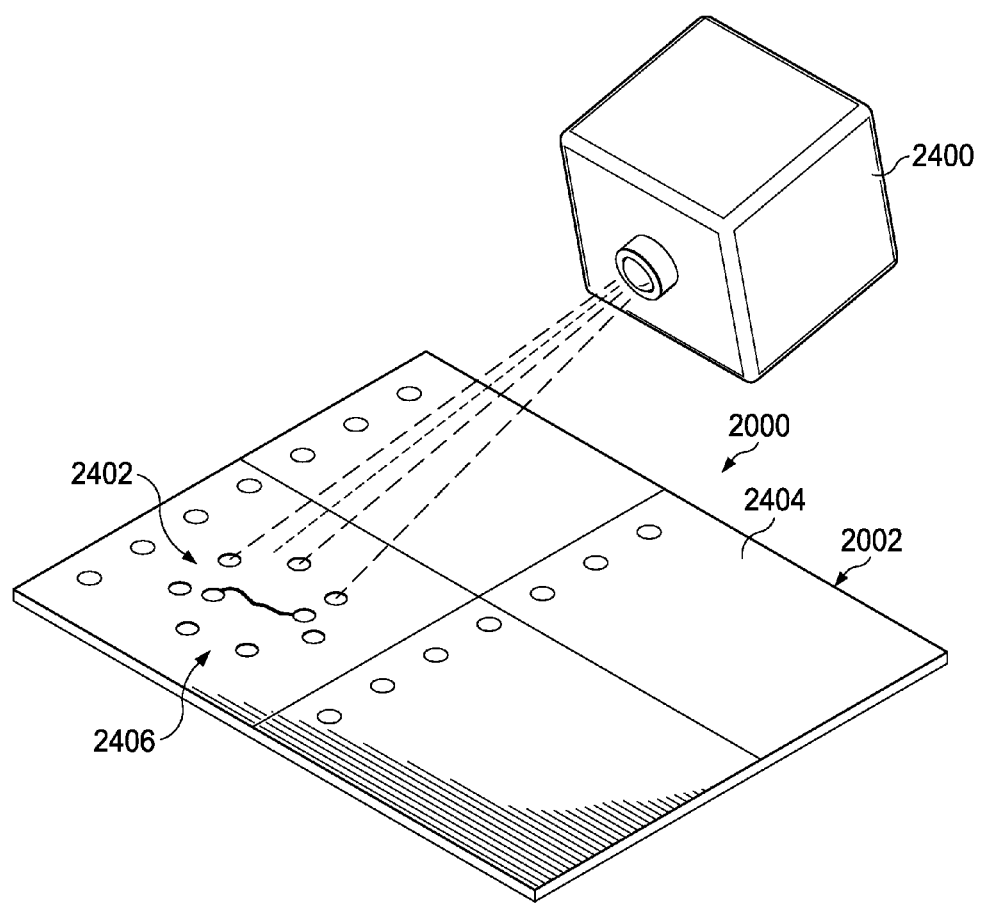
FIG. 24 is an illustration of reworking a metal structure in accordance with an illustrative embodiment.

Turning next to FIG. 24, an illustration of reworking a metal structure is depicted in accordance with an illustrative embodiment. In this depicted example, projector 2400 projects image 2402 onto surface 2404 of metallic structure 2002 for part 2000. As can be seen, image 2402 may be used as a template to form holes 2406 in metallic structure 2002 as part of the rework operation.

Figure 25:
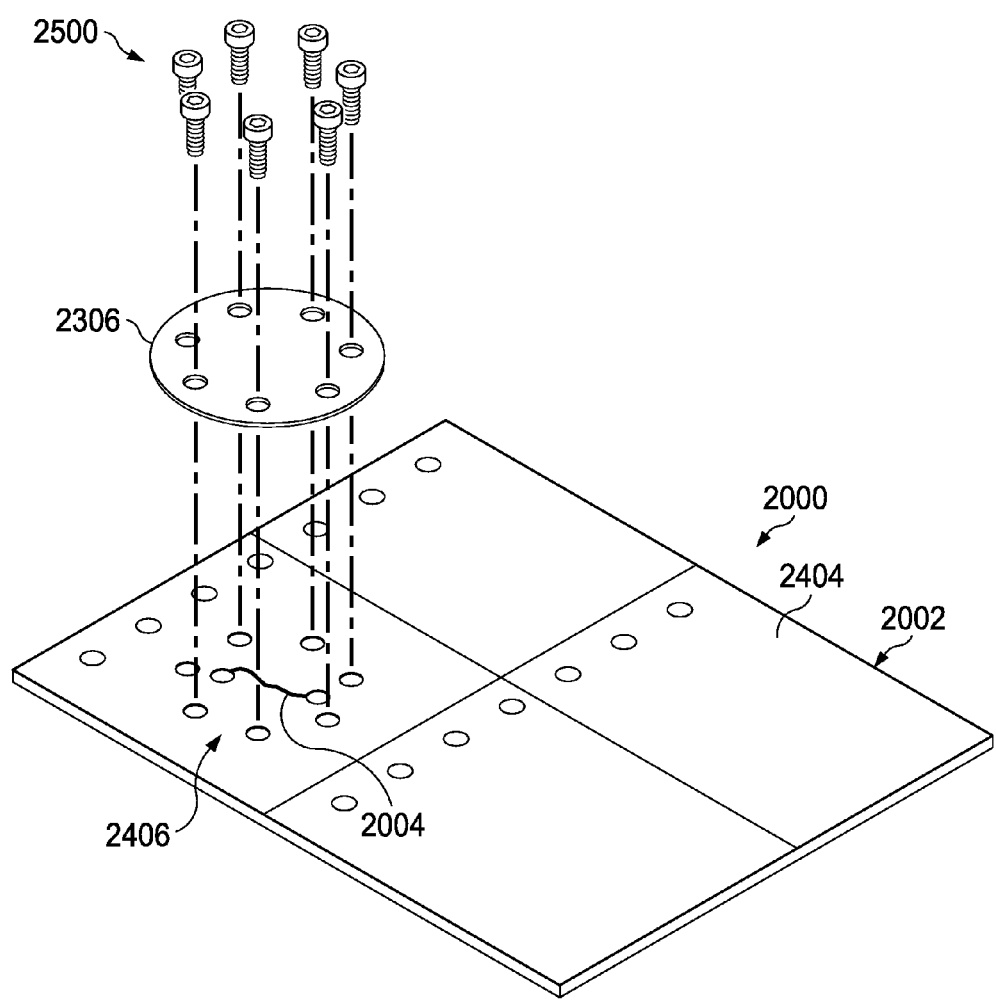
FIG. 25 is another illustration of reworking a metal structure in accordance with an illustrative embodiment.

Turning now to FIG. 25, another illustration of reworking a metal structure is depicted in accordance with an illustrative embodiment. In this illustrative example, patch 2306 is positioned over metallic structure 2002. Additionally, fasteners 2500 may be used to fasten patch 2306 to metallic structure 2002 for part 2000 over inconsistency 2004.

The illustrations of FIGS. 12-25 are not meant to limit the manner in which an illustrative embodiment may be implemented. For example, although the patches are shown as being circular in shape, the patch used to perform rework operations may have other shapes. For example, the patches may be square, rectangular, irregular in shape, or some other suitable shape. As another illustrative example, although a honeycomb core is shown in one example, other types of cores may be used. For example, a foam core, a wood core, or some other suitable type of core may be present in a core structure. In yet other illustrative examples, more than two facesheets may be present for a composite core structure.

Figure 26:
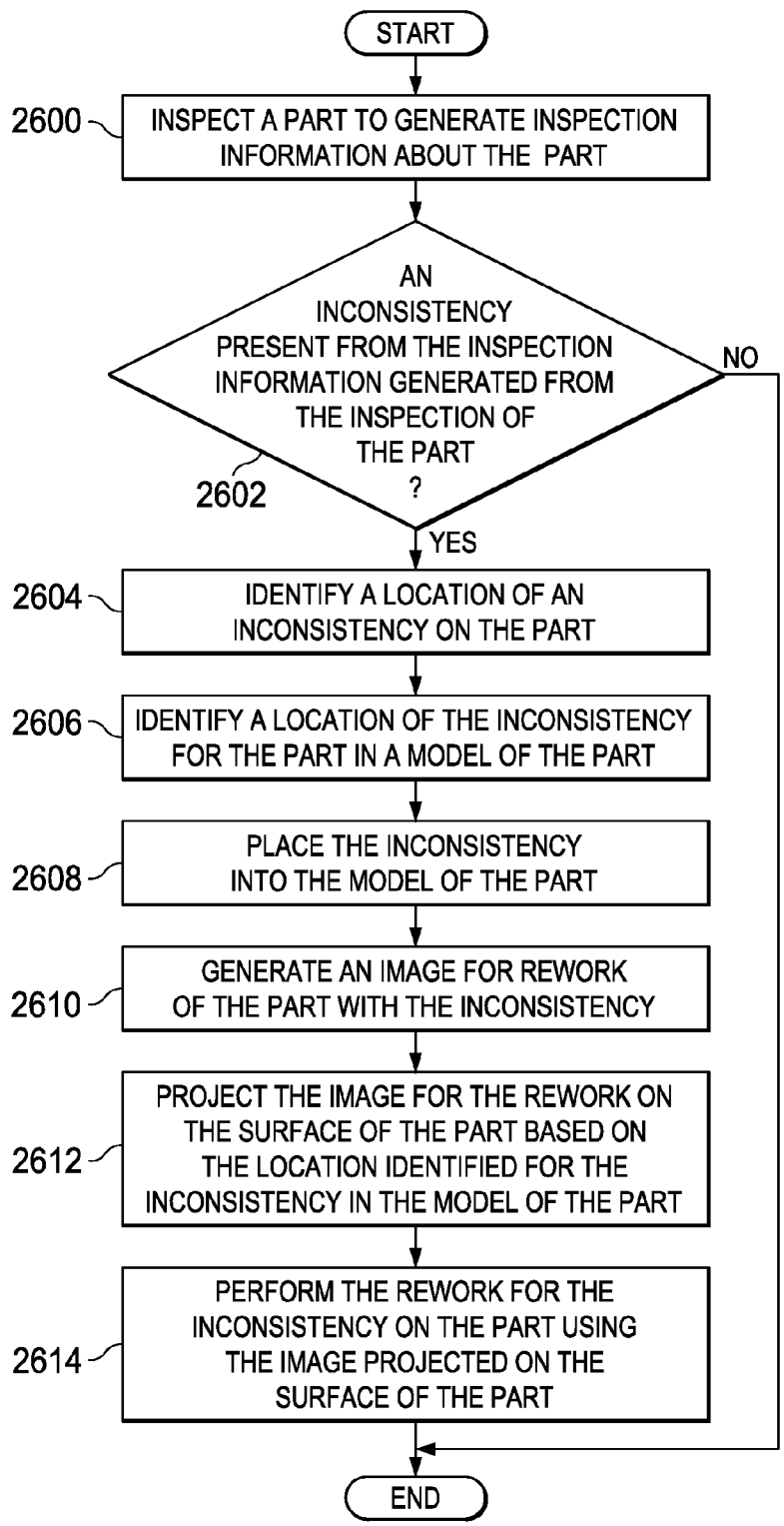
FIG. 26 is an illustration of a flowchart of a process for reworking an inconsistency on a part in accordance with an illustrative embodiment.

With reference now to FIG. 26, an illustration of a flowchart of a process for reworking an inconsistency on a part is depicted in accordance with an illustrative embodiment. The process illustrated in FIG. 26 may be implemented in rework environment 1100 in FIG. 11. In particular, the process may be implemented in rework system 1102 in FIG. 11 in this illustrative example.

The process begins by inspecting a part to generate inspection information about the part (operation 2600). This inspection information may include images and other suitable information. The inspection information may include, for example, coordinates of the location where the images were generated, a timestamp, and other suitable information. The inspection may be performed using nondestructive inspection system 1120 in FIG. 11.

A determination is made as to whether an inconsistency is present from the inspection information generated from the inspection of the part (operation 2602). If an inconsistency is identified from inspection information, the process identifies a location of an inconsistency on the part (operation 2604). This location may be described using coordinates from the inspection information. The process then identifies a location of the inconsistency for the part in a model of the part (operation 2606). The coordinates identified from the inspection information may be translated or transformed into the coordinates for the model of the parts.

The process then places the inconsistency into the model of the part (operation 2608). In this operation, the inconsistency identified is included in the model for use in planning rework of the part.

Thereafter, the process generates an image for rework of the part with the inconsistency (operation 2610). The image may be generated from inspection information about the inconsistency detected in the part. For example, this image may be generated based on the location of the inconsistency. An area encompassing the inconsistency may be identified for the rework of the inconsistency on the part in the location where the inconsistency is located based on the size of the inconsistency. In these illustrative examples, the area may be two-dimensional or three-dimensional depending on the particular implementation.

Thereafter, the image for the rework is projected on the surface of the part based on the location identified for the inconsistency in the model of the part (operation 2612). In these illustrative examples, the image may form a template for performing rework.

Thereafter, the rework is performed for the inconsistency on the part using the image projected on the surface of the part (operation 2614), with the process terminating thereafter.

With reference again operation 2602, if an inconsistency is not identified in the inspection information, then rework of the part is unnecessary. The process terminates in this instance.

Figure 27:
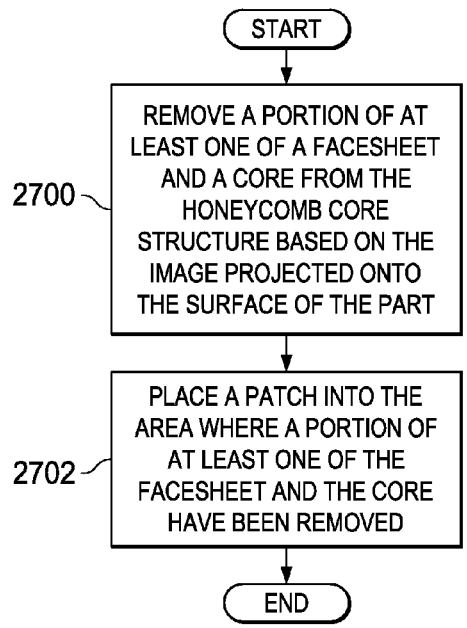
FIG. 27 is an illustration of a flowchart of a process for performing rework on a composite core structure in accordance with an illustrative embodiment.

Turning now to FIG. 27, an illustration of a flowchart of a process for performing rework on a composite core structure is depicted in accordance with an illustrative embodiment. The flowchart in FIG. 27 is an example of one manner in which operation 2614 may be performed for a composite core structure for a part such as a honeycomb core structure.

The process begins by removing a portion of at least one of a facesheet and a core from the honeycomb core structure based on the image projected onto the surface of the part (operation 2700). In this manner, a portion of the facesheet, a portion of the core, or a portion of both may be removed as defined by the area shown in an image projected onto the surface of the honeycomb core structure for the part. For example, the area in the image may be a circle that may be used as a template to remove a portion of the honeycomb core structure. The area in the image may have other shapes such as an oval, a rectangle, a square, a triangle, a pentagon, an irregular shape, or other suitable shapes.

Thereafter, the process places a patch into the area where a portion of at least one of the facesheet and the core have been removed (operation 2702), with the process terminating thereafter. The placement includes bonding or otherwise securing the patch to the honeycomb core structure.

Figure 28:
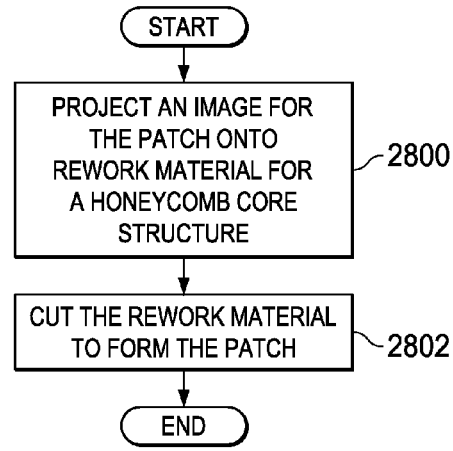
FIG. 28 is an illustration of a flowchart of a process for forming a patch for reworking a honeycomb core structure in accordance with an illustrative embodiment.

With reference next to FIG. 28, an illustration of a flowchart of a process for forming a patch for reworking a honeycomb core structure is depicted in accordance with an illustrative embodiment. The process illustrated in FIG. 28 may be used to generate a patch for use in operation 2614 in FIG. 26 and for the different operations in FIG. 27.

The process begins by projecting an image for the patch onto rework material for a honeycomb core structure (operation 2800). In this illustrative example, the rework material may be at least one of a facesheet, a honeycomb core, or other suitable types of material. The image projected onto the rework material has a shape for the patch to be performed. The image is projected onto the material such that, in addition to having the correct shape, the patch also has the correct size for use in performing the rework operation.

The process then cuts the rework material to form the patch (operation 2802), with the process terminating thereafter. In this manner, an image may be used as a template to form a patch.

Figure 29:
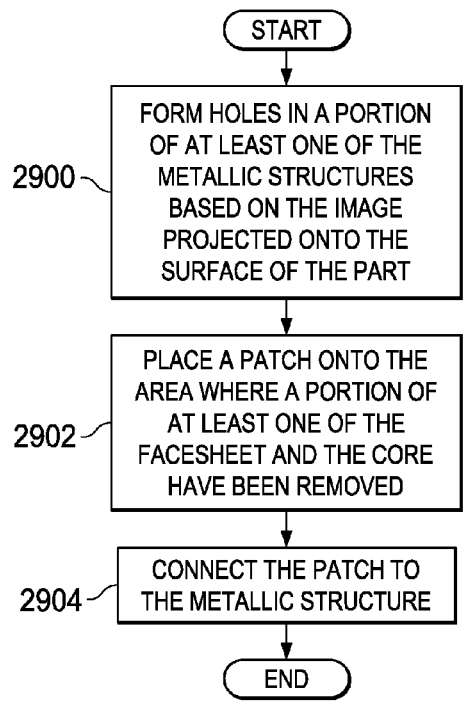
FIG. 29 is an illustration of a flowchart of a process for performing rework on a metallic structure in accordance with an illustrative embodiment.

Turning now to FIG. 29, an illustration of a flowchart of a process for performing rework on a metallic structure is depicted in accordance with an illustrative embodiment. The flowchart in FIG. 29 is an example of one manner in which operation 2614 may be performed for a metallic structure for a part.

The process begins by forming holes in a portion of at least one of the metallic structures based on the image projected onto the surface of the part (operation 2900). These holes in the metallic structure may be configured to receive fasteners to connect the patch to the metallic structure. Additionally, the holes also may include holes that may be formed in the metallic structure used to reduce spreading of the inconsistency in the part. In the illustrative examples, the image may be used as a template for identifying locations and sizes of the holes on the metallic structure.

Thereafter, the process places a patch onto the area where a portion of at least one of the facesheet and the core have been removed (operation 2902). The process then connects the patch to the metallic structure (operation 2904), with the process terminating thereafter. In operation 2904, the patch may be secured in a number of ways. For example, fasteners, such as bolts, may be installed to secure the patch to the metallic structure. In another illustrative example, the patch may be welded, bonded, or otherwise secured to the metallic structure.

Figure 30:
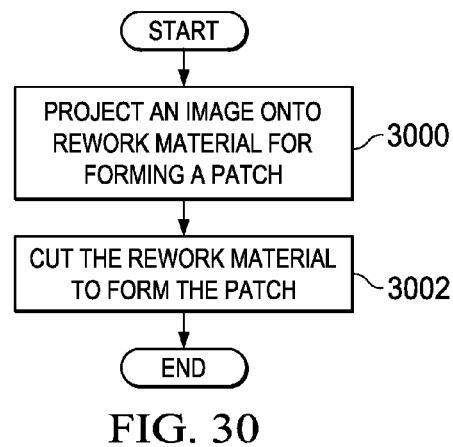
FIG. 30 is an illustration of a flowchart of a process for creating a patch for a metallic structure in accordance with an illustrative embodiment.

With reference next to FIG. 30, an illustration of a flowchart of a process for creating a patch for a metallic structure is depicted in accordance with an illustrative embodiment. The process illustrated in FIG. 30 may be used to create a patch for use in operation 2614 in FIG. 26 and for the different operations in FIG. 29.

The process begins by projecting an image onto rework material for forming a patch (operation 3000). In this illustrative example, the image defines an area on the rework material to form a patch. In other words, the image may be used as a template to create a patch from the rework material. The process then cuts the rework material to form the patch (operation 3002), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in addition to generating an image for rework of the part with the inconsistency in operation 2610, other information also may be generated as part of operation 2610 for reworking the part. For example, instructions, diagrams, and other information also may be generated. This additional rework information also may be generated as a separate operation.

Figure 31:
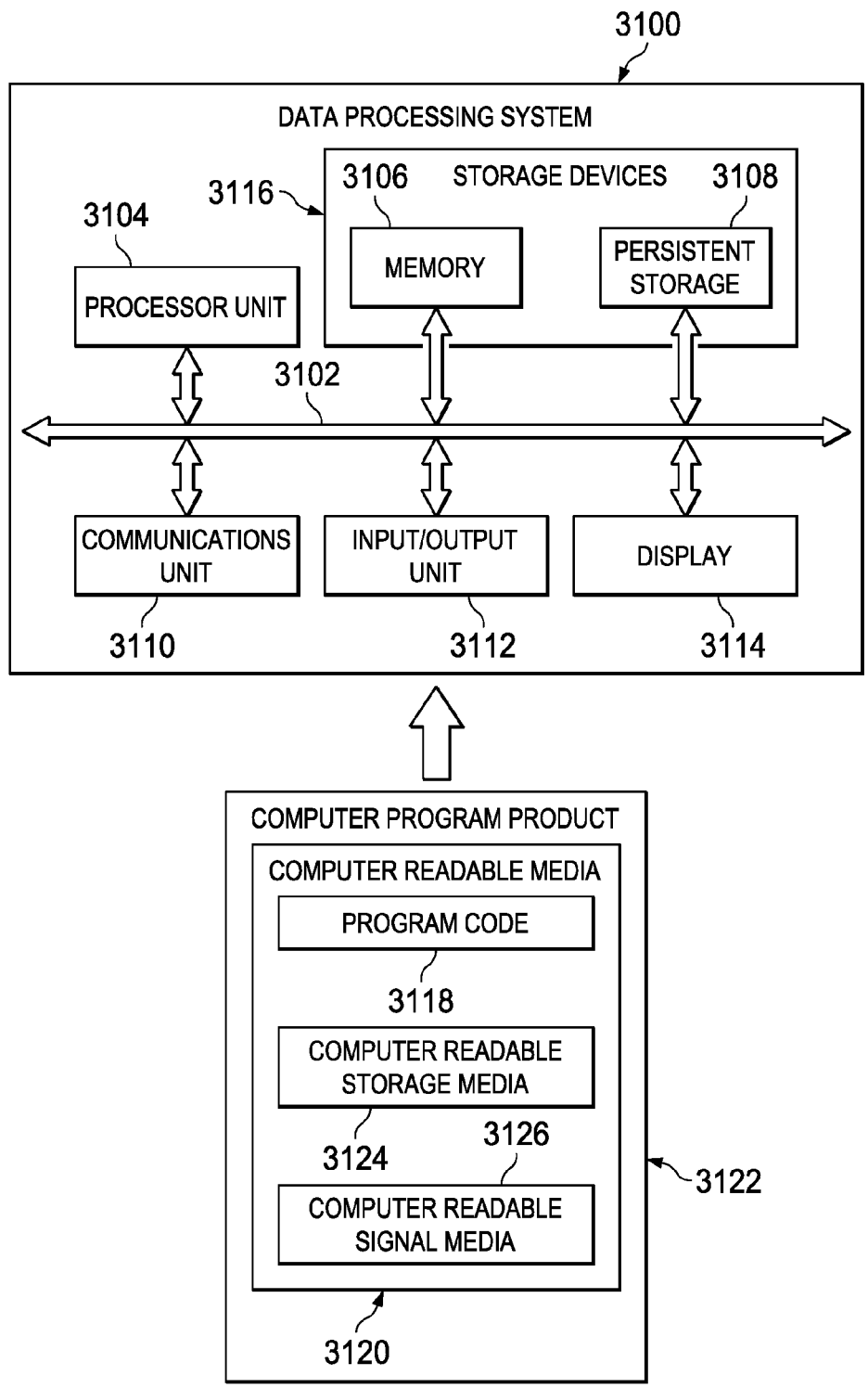
FIG. 31 is an illustration of a block diagram of a data processing system in accordance with an illustrative embodiment.

Turning now to FIG. 31, an illustration of a block diagram of a data processing system is depicted in accordance with an illustrative embodiment. Data processing system 3100 may be used to implement programmable device 16 and computer system 1140. In this illustrative example, data processing system 3100 includes communications framework 3102, which provides communications between processor unit 3104, memory 3106, persistent storage 3108, communications unit 3110, input/output unit 3112, and display 3114. In this example, communication framework may take the form of a bus system.

Processor unit 3104 serves to execute instructions for software that may be loaded into memory 3106. Processor unit 3104 may be a number of processors, a multi-processor core, or some other type of processor, depending on the particular implementation.

Memory 3106 and persistent storage 3108 are examples of storage devices 3116. A storage device is any piece of hardware that is capable of storing information, such as, for example, without limitation, data, program code in functional form, and/or other suitable information either on a temporary basis and/or a permanent basis. Storage devices 3116 may also be referred to as computer readable storage devices in these illustrative examples. Memory 3106, in these examples, may be, for example, a random access memory or any other suitable volatile or non-volatile storage device. Persistent storage 3108 may take various forms, depending on the particular implementation.

For example, persistent storage 3108 may contain one or more components or devices. For example, persistent storage 3108 may be a hard drive, a flash memory, a rewritable optical disk, a rewritable magnetic tape, or some combination of the above. The media used by persistent storage 3108 also may be removable. For example, a removable hard drive may be used for persistent storage 3108.

Communications unit 3110, in these illustrative examples, provides for communications with other data processing systems or devices. In these illustrative examples, communications unit 3110 is a network interface card.

Input/output unit 3112 allows for input and output of data with other devices that may be connected to data processing system 3100. For example, input/output unit 3112 may provide a connection for user input through a keyboard, a mouse, and/or some other suitable input device. Further, input/output unit 3112 may send output to a printer. Display 3114 provides a mechanism to display information to a user.

Instructions for the operating system, applications, and/or programs may be located in storage devices 3116, which are in communication with processor unit 3104 through communications framework 3102. The processes of the different embodiments may be performed by processor unit 3104 using computer-implemented instructions, which may be located in a memory, such as memory 3106.

These instructions are referred to as program code, computer usable program code, or computer readable program code that may be read and executed by a processor in processor unit 3104. The program code in the different embodiments may be embodied on different physical or computer readable storage media, such as memory 3106 or persistent storage 3108.

Program code 3118 is located in a functional form on computer readable media 3120 that is selectively removable and may be loaded onto or transferred to data processing system 3100 for execution by processor unit 3104. Program code 3118 and computer readable media 3120 form computer program product 3122 in these illustrative examples. In one example, computer readable media 3120 may be computer readable storage media 3124 or computer readable signal media 3126.

In these illustrative examples, computer readable storage media 3124 is a physical or tangible storage device used to store program code 3118 rather than a medium that propagates or transmits program code 3118.

Alternatively, program code 3118 may be transferred to data processing system 3100 using computer readable signal media 3126. Computer readable signal media 3126 may be, for example, a propagated data signal containing program code 3118. For example, computer readable signal media 3126 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 3100 are not meant to provide architectural limitations to the manner in which different embodiments may be implemented. The different illustrative embodiments may be implemented in a data processing system including components in addition to and/or in place of those illustrated for data processing system 3100. Other components shown in FIG. 31 can be varied from the illustrative examples shown. The different embodiments may be implemented using any hardware device or system capable of running program code 3118.

In this manner, one or more illustrative embodiments may use digital data such as images to provide guides to operators in performing rework on different parts. In this manner, non-contact marking may be used to locate areas for which rework is to be performed. One or more illustrative examples may be used to avoid the need for paper, mylar transfers, or other currently used techniques that may be more time-consuming and difficult than use than desired.

The illustration of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for reworking an inconsistency on a part, the method comprising:
   identifying a location of the inconsistency for the part in a model of the part;
   generating an image for a rework for the part, wherein the image comprises an arrangement of holes for fasteners to secure a patch;
   projecting the image for the rework on the part based on the location identified for the inconsistency; and
   performing the rework for the inconsistency on the part using the image projected on the part.

2. The method of claim 1 comprising:
   generating inspection information about the part with the inconsistency and wherein generating the image for the rework of the inconsistency comprises:
   generating the image for the rework of the part from the inspection information about the part with the inconsistency.

3. The method of claim 1, wherein the part is selected from one of a composite core structure, a composite honeycomb core structure, a composite sheet, and a metal sheet.

4. The method of claim 1, wherein the image comprises an area of the part for removal.

5. The method of claim 1, wherein the part is a honeycomb core structure and performing the rework comprises:
   removing a portion of at least one of a facesheet and a core from the honeycomb core structure.

6. The method of claim 1 further comprising:
   inspecting the rework for the inconsistency on the part using the image of the inconsistency projected on the part.

7. The method of claim 1, wherein the image is a first image and further comprising:
   projecting a second image onto rework material; and
   forming a patch from the rework material using the second image.

8. The method of claim 1, wherein the image is projected on the part by a projector system.

9. The method of claim 8, wherein the projector system is comprised of a group of projector devices, wherein a projector device in the group of projector devices is selected from one of a laser projector, a light emitting diode projector, a halogen light projector, and an incandescent light projector.

10. The method of claim 2, wherein the inspection information is generated using a nondestructive inspection system.

11. An apparatus comprising:
    a rework generator configured to identify a location of an inconsistency for a part in a model of the part; generate an image for a rework for the part, wherein the image comprises an arrangement of holes for fasteners to secure a patch; project the image for the rework on the part based on the location identified for the inconsistency; and perform the rework for the inconsistency on the part using the image projected on the part.

12. The apparatus of claim 11 further comprising:
    a projector system configured to project the image for the rework on the part under control of the rework generator.

13. The apparatus of claim 11 further comprising:
    a nondestructive inspection system configured to generate inspection information about the part with the inconsistency and wherein the rework generator is configured to generate the image for the rework of the part from the inspection information.

14. The apparatus of claim 11, wherein the part is selected from one of a composite core structure, a composite honeycomb core structure, a composite sheet, and a metal sheet.

15. The apparatus of claim 11, wherein the image comprises an area of the part for removal.

16. The apparatus of claim 11, wherein the part is a honeycomb core structure and performing the rework comprises removal of a portion of at least one of a facesheet and a core from the honeycomb core structure.

17. The apparatus of claim 11, wherein the image is a first image and wherein the rework generator is further configured to project a second image onto rework material defining a patch from the rework material using the second image.

18. The apparatus of claim 12, wherein the projector system is comprised of a group of projector devices, wherein a projector device in the group of projector devices is selected from one of a laser projector, a light emitting diode projector, a halogen light projector, and an incandescent light projector.

* * * * *